(12) United States Patent  (10) Patent No.: US 8,509,124 B2
Lim et al.  (45) Date of Patent: Aug. 13, 2013

(54) METHOD FOR TRANSCEIVING A SIGNAL IN WIRELESS COMMUNICATION SYSTEM

(75) Inventors: Dong Guk Lim, Gyeonggi-do (KR);
Sung Ho Moon, Gyeonggi-do (KR);
Han Gyu Cho, Gyeonggi-do (KR);
Yeong Hyeon Kwon, Gyeonggi-do (KR); Jin Sam Kwak, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 393 days.

(21) Appl. No.: 12/752,550

(22) Filed: Apr. 1, 2010

(65) Prior Publication Data

US 2010/0254288 A1    Oct. 7, 2010

Related U.S. Application Data

(60) Provisional application No. 61/166,252, filed on Apr. 3, 2009, provisional application No. 61/218,044, filed on Jun. 17, 2009.

(30) Foreign Application Priority Data

Mar. 23, 2010  (KR) .................. 10-2010-0025928

(51) Int. Cl.
*H04J 1/04*   (2006.01)
*H04J 11/00*  (2006.01)
*H04B 7/208*  (2006.01)
*H04W 72/04*  (2009.01)

(52) U.S. Cl.
USPC ............ 370/281; 370/208; 370/344; 370/329

(58) Field of Classification Search
USPC ................. 370/280, 294, 295, 203, 208, 344, 370/464, 479, 335, 342, 206, 281, 328, 329, 370/474; 375/260
See application file for complete search history.

(56) References Cited

U.S. PATENT DOCUMENTS

| | | | |
|---|---|---|---|
| 8,000,272 B2* | 8/2011 | Gao et al. ...................... | 370/280 |
| 8,165,106 B2* | 4/2012 | Yang et al. .................... | 370/350 |
| 2005/0195909 A1 | 9/2005 | Hwang et al. | |
| 2007/0153735 A1* | 7/2007 | Frederiksen et al. ......... | 370/329 |
| 2008/0039107 A1* | 2/2008 | Ma et al. ........................ | 455/450 |
| 2008/0095195 A1* | 4/2008 | Ahmadi et al. ................ | 370/478 |
| 2008/0107047 A1* | 5/2008 | Olfat ............................. | 370/280 |
| 2009/0046605 A1 | 2/2009 | Gao et al. | |
| 2009/0067377 A1* | 3/2009 | Talukdar et al. .............. | 370/329 |
| 2010/0061326 A1* | 3/2010 | Lee et al. ....................... | 370/329 |
| 2010/0142458 A1* | 6/2010 | Mark ............................. | 370/329 |
| 2010/0165972 A1* | 7/2010 | Lin et al. ....................... | 370/344 |

FOREIGN PATENT DOCUMENTS

WO    2006/000091    1/2006

* cited by examiner

*Primary Examiner* — Kwang B Yao
*Assistant Examiner* — Candal Elpenord
(74) *Attorney, Agent, or Firm* — Lee, Hong, Degerman, Kang & Waimey

(57) ABSTRACT

A method of transmitting a signal using a prescribed frame structure in a wireless communication system is disclosed. A mobile station can transmit or receive a signal using a frame structure with a CP length corresponding to ¼ of a useful symbol. Moreover, the mobile station can transmit or receive a signal using a frame structure with a CP length corresponding to ⅛ of a useful symbol.

4 Claims, 27 Drawing Sheets

METHOD FOR TRANSCEIVING A SIGNAL IN WIRELESS COMMUNICATION SYSTEM

CROSS-REFERENCE TO RELATED APPLICATIONS

Pursuant to 35 U.S.C. §119, this application claims the benefit of priority to Provisional Application Nos. 61/166,252, filed on Apr. 3, 2009, and 61/218,044, filed on Jun. 17, 2009, and also claims the benefit of earlier filing date and right of priority to Korean application No. 10-2010-0025928, filed on Mar. 23, 2010, the contents of all of which are incorporated by reference herein in their entireties.

BACKGROUND OF THE INVENTION

1. Field of the Invention

The present invention relates to a signal transmitting method, and more particularly, to a method of transmitting a signal in a wireless communication system using a prescribed frame structure.

2. Discussion of the Related Art

Generally, IEEE 802.16m system is able to support FDD (frequency division duplex) including H-FDD (half-frequency division duplex) mobile station operation and TDD (time division duplex) both. The IEEE 802.16m system uses OFDMA (orthogonal frequency division multiplexing access) as a multiple access scheme in DL (downlink) and UL (uplink). Contents for OFDMA parameters are shown in Table 1.

structed with eight subframes. One subframe can be allocated for downlink or uplink transmission. A first type can be defined as a subframe including 6 OFDMA symbols. A second type can be defined as a subframe including 7 OFDMA symbols. And, a third type can be defined as a subframe including 5 OFDMA symbols.

A basic frame structure is applicable to FDD including H-FDD mobile station operation and TDD both. The number of switching points in each radio frame of TDD system is 2. The switching point can be defined according to a change of directionality from downlink to uplink or uplink to downlink.

H-FDD mobile station can be included in FDD system. A frame structure in viewpoint of the H-FDD mobile station is similar to a TDD frame structure. Yet, downlink and uplink transmissions occur in two individual frequency bands. Transmission gaps between downlink and uplink (and vice versa) are requested to switch transmitting and receiving circuits to each other.

FIG. 2 is a diagram for an example of TDD frame having a DL-to-UL ratio set to 5:3.

Referring to FIG. 2, assuming that an OFDMA symbol duration is 102.857 μs and that a CP (cyclic prefix) length is set to a length corresponding to ⅛ of a useful symbol length (Tu), lengths of first and second type subframes are 0.617 ms and 0.514 ms, respectively. A last DL (downlink) subframe SF4 is a subframe of a third type. And, a TTG (transmit transition gap) and an RTG (receive transition gap) are set to 105.714 μs and 60 μs, respectively. According to another numerology, the number of subframes per frame and the number of symbols within a subframe may be different.

TABLE 1

| Nominal Channel Bandwidth (MHz) | | | 5 | 7 | 8.75 | 10 | 20 |
|---|---|---|---|---|---|---|---|
| Over-sampling Factor | | | 28/25 | 8/7 | 8/7 | 28/25 | 28/25 |
| Sampling Frequency (MHz) | | | 5.6 | 8 | 10 | 11.2 | 22.4 |
| FFT Size | | | 512 | 1024 | 1024 | 1024 | 2048 |
| Sub-Carrier Spacing (kHz) | | | 10.937500 | 7.812500 | 9.765625 | 10.937500 | 10.937500 |
| Useful Symbol Time $T_u$ (μs) | | | 91.429 | 128 | 102.4 | 91.429 | 91.429 |
| Cyclic Prefix (CP) $T_g = ⅛ T_u$ | Symbol Time $T_s$ (μs) | | 102.857 | 144 | 115.2 | 102.857 | 102.857 |
| | FDD | Number of OFDM symbols per Frame | 48 | 34 | 43 | 48 | 48 |
| | | Idle time (μs) | 62.857 | 104 | 46.40 | 62.857 | 62.857 |
| | TDD | Number of OFDM symbols per Frame | 47 | 33 | 42 | 47 | 47 |
| | | TTG + RTG (μs) | 165.714 | 248 | 161.6 | 165.714 | 165.714 |
| Cyclic Prefix (CP) $T_g = 1/16 T_u$ | Symbol Time $T_s$ (μs) | | 97.143 | 136 | 108.8 | 97.143 | 97.143 |
| | FDD | Number of OFDM symbols per Frame | 51 | 36 | 45 | 51 | 51 |
| | | Idle time (μs) | 45.71 | 104 | 104 | 45.71 | 45.71 |
| | TDD | Number of OFDM symbols per Frame | 50 | 35 | 44 | 50 | 50 |
| | | TTG + RTG (μs) | 142.853 | 240 | 212.8 | 142.853 | 142.853 |
| Cyclic Prefix (CP) $T_g = ¼ T_u$ | Symbol Time $T_s$ (μs) | | 114.286 | [TBD] | [TBD] | 114.286 | 114.286 |
| | FDD | Number of OFDM symbols per Frame | 43 | [TBD] | [TBD] | 43 | 43 |
| | | Idle time (μs) | 85.694 | [TBD] | [TBD] | 85.694 | 85.694 |
| | TDD | Number of OFDM symbols per Frame | 42 | [TBD] | [TBD] | 42 | 42 |
| | | TTG + RTG (μs) | 199.98 | [TBD] | [TBD] | 199.98 | 199.98 |

In the following description, a frame structure of the IEEE 802.16m system is schematically explained.

FIG. 1 is a diagram of a basic frame structure in IEEE 802.16m system.

Referring to FIG. 1, each 20 ms super frame is divided into four 5 ms radio frames equal to each other in size. And, the corresponding super frame starts with a super frame header (SFH). In case of using the same OFDMA parameters of Table 1 within a channel bandwidth selected from 5 MHz, 10 MHz and 20 MHz, each of the 5 ms radio frames is con- FIG. 3 is a diagram for an example of a frame structure in FDD system.

Referring to FIG. 3, a base station supporting FDD system is able to simultaneously support half-duplex mobile station operating with a same RF carrier and a full-duplex mobile station both. A mobile station supporting FDD system should use either H-FDD system or FDD system. All subframes are available for both DL and UL transmissions. The DL and UL transmissions can be discriminated from each other in frequency domain. One super frame is divided into 4 frames. And, one of the frames includes 8 subframes.

FIG. 4 is a diagram for TDD and FDD frame structures with CP length corresponding to 1/16 of a useful symbol length (Tu).

Referring to FIG. 4, a frame of IEEE 802.16m system, which has a CP length corresponding to 1/16 of a useful symbol length (Tu) for channel bandwidths of 5 MHz, 10 MHz and 20 MHz, includes 5 first type subframes and 3 second type subframes in FDD system or includes 6 first type subframes and 2 second type subframes in TDD system.

Assuming that an OFDMA symbol duration is 97.143 μs and that a CP (cyclic prefix) length is set to a length corresponding to 1/16 of a useful symbol length (Tu), lengths of the first and second type subframes are 0.583 ms and 0.680 ms, respectively. And, a TTG (transmit transition gap) and an RTG (receive transition gap) are set to 82.853 μs and 60 μs, respectively. According to another numerology, the number of subframes per frame and the number of symbols within a subframe may be different.

As mentioned in the foregoing description, in the IEEE 802.16m system, OFDMA parameters and frame structures for channel bandwidths of 5 MHz, 10 MHz and 20 MHz are only defined for a case that a CP length is 1/8 Tb and a case that a CP length is 1/16 Tb. Namely, a frame structure for a case that a CP length is 1/4 Tb has not been proposed so far.

A frame structure with a CP length of 1/4 Tb may cause a problem with a previous frame structure with a CP length of 1/8 or 1/16 Tb that interference is generated from a switching point between downlink and uplink. However, a new frame structure enabling mutual co-existence by solving this problem has not been proposed so far.

SUMMARY OF THE INVENTION

Accordingly, the present invention is directed to a method of transmitting a signal in a wireless communication system that substantially obviates one or more problems due to limitations and disadvantages of the related art.

An object of the present invention is to provide a method for transceiving a signal in a wireless communication system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for transceiving a signal using a frame structure in a wireless communication system, the method includes the steps of transceiving a signal through a frame according to the frame structure, wherein the frame comprises 7 subframes, and the 7 subframes comprise at least one of a first type subframe including 6 OFDMA (orthogonal frequency division multiple access) symbols or a second type subframe including 7 OFDMA symbols.

Preferably, the frame is a TDD (time division duplex) frame or an FDD (frequency division duplex) frame. And, the frame is the FDD frame, and each of the 7 subframes in the TDD frame is the first type subframe.

More preferably, the TDD frame includes a downlink interval and an uplink interval subsequent to the downlink interval, wherein a TTG (transmit transition gap) is located between the downlink interval and the uplink interval in the TDD frame, and wherein an RTG (receive transition gap) is located next to a last subframe of the uplink interval in the TDD frame.

In this case, a ratio of the number of downlink subframes to the number of uplink subframes in the TDD frame is set to one of 2:5, 3:4, 4:3, 5:2 and 6:1.

And, the frame is the FDD frame and the FDD frame includes 6 first type subframes and 1 second type subframe.

More preferably, the 1 second type subframe in the FDD frame is located in the same order of a last downlink subframe located in the TDD frame.

In this case, the 1 second type subframe is located at a fourth subframe in the FDD frame.

Moreover, an idle time is located next to a last subframe in the FDD frame.

An idle time is located next to a last subframe in the FDD frame. The frame comprises a CP (cyclic prefix), a length of the CP is set to 1/4 of a useful symbol length. A channel bandwidth of the frame is set to one of 5 MHz, 10 MHz, and 20 MHz.

In another aspect of the present invention, the method for transceiving a signal using a frame structure in a wireless communication system, the method includes transceiving a signal through a frame according to the frame structure, wherein the frame comprises 8 subframes, and the 8 subframes comprise at least one of a first type subframe including 6 OFDMA (orthogonal frequency division multiple access) symbols or a third type subframe including 5 OFDMA symbols.

In further another aspect of the present invention, an apparatus for transceiving a signal using a frame structure in a wireless communication system, the apparatus includes transceiving module for transceiving a signal through a frame according to the frame structure, wherein the frame comprises 7 subframes, and the 7 subframes comprise at least one of a first type subframe including 6 OFDMA (orthogonal frequency division multiple access) symbols or a second type subframe including 7 OFDMA symbols.

In further another aspect of the present invention, an apparatus for transceiving a signal using a frame structure in a wireless communication system, the apparatus includes transceiving module for transceiving a signal through a frame according to the frame structure, wherein the frame comprises 8 subframes, and the 8 subframes comprise at least one of a first type subframe including 6 OFDMA (orthogonal frequency division multiple access) symbols or a third type subframe including 5 OFDMA symbols.

First of all, a mobile station (MS) can transmit or receive a signal using a frame structure with a CP length corresponding to 1/4 of a useful symbol.

Secondly, the mobile station can transmit or receive a signal using a frame structure with a CP length corresponding to 1/4 of a useful symbol.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
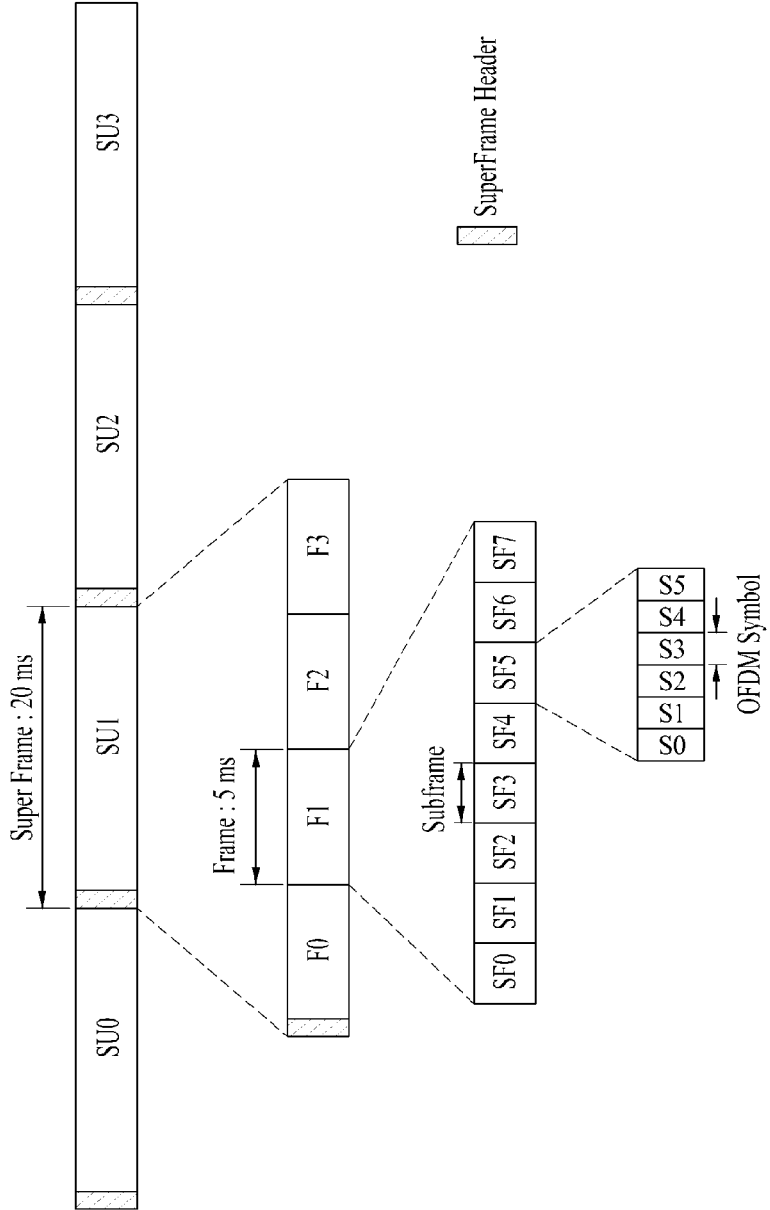
FIG. 1 is a diagram of a basic frame structure in IEEE 802.16m system.
Figure 2:
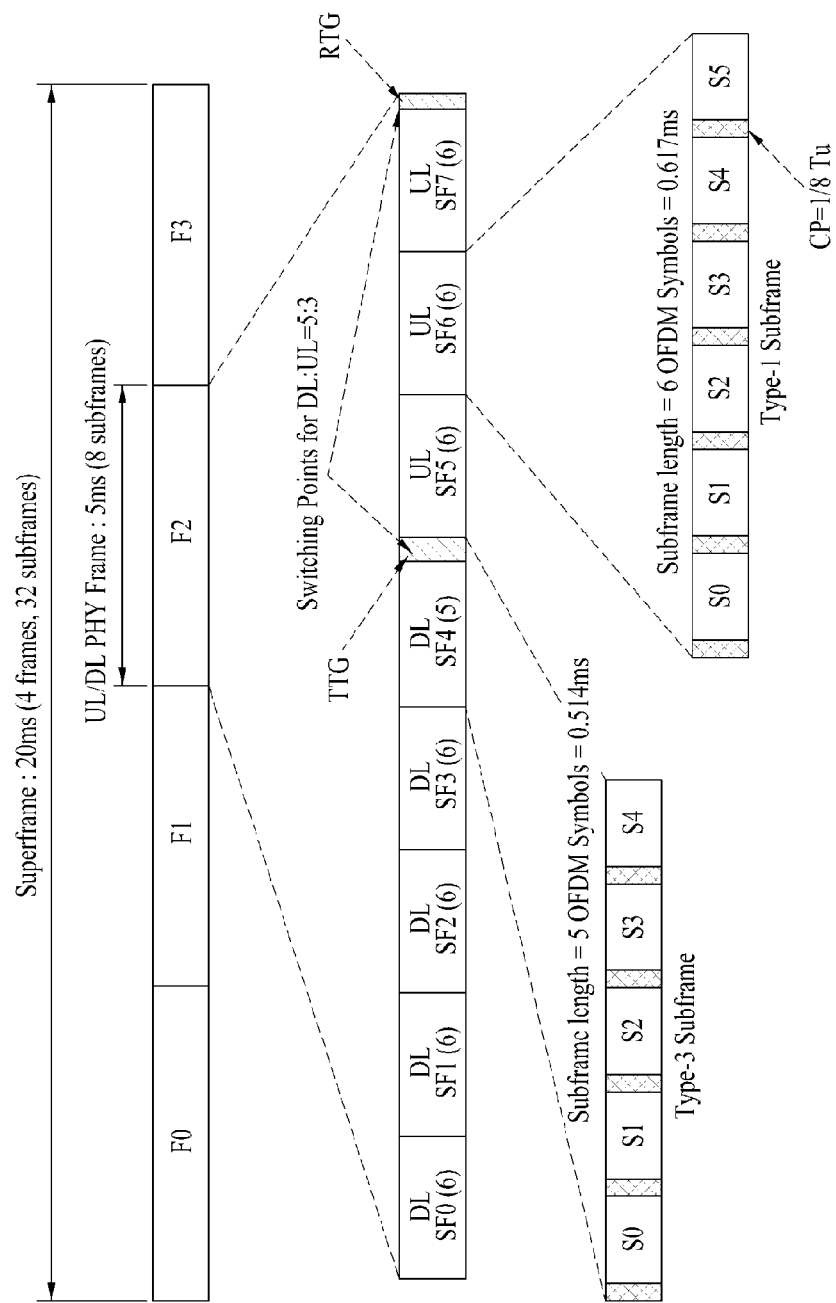
FIG. 2 is a diagram for an example of TDD frame having a DL-to-UL ratio set to 5:3.
Figure 3:
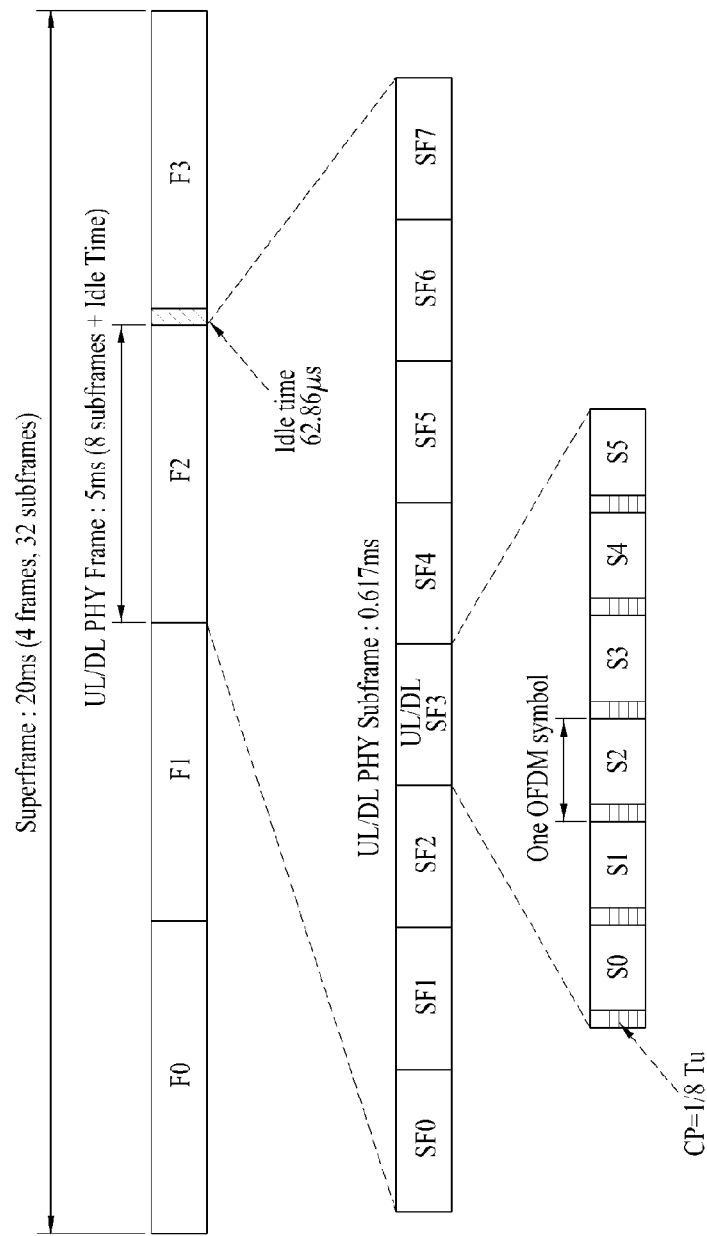
FIG. 3 is a diagram for an example of a frame structure in FDD system.
Figure 4:
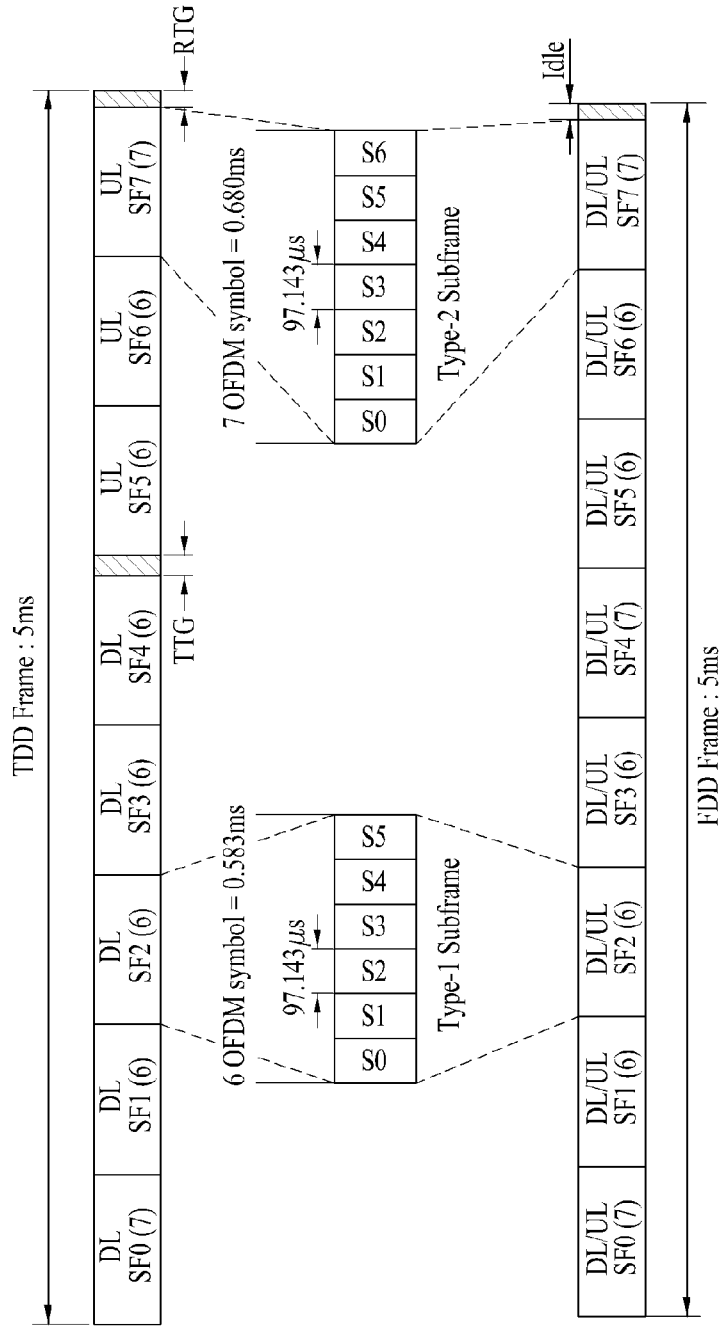
FIG. 4 is a diagram for TDD and FDD frame structures with CP length corresponding to 1/16 of a useful symbol length (Tu)

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made centering on predetermined terminologies, they need not to be limited to the terminologies. If the following descriptions are made using random terminologies, the same meanings can be provided. Wherever possible, the same reference numbers will be used throughout the drawings to refer to the same or like parts.

Throughout this disclosure, if a prescribed part 'includes' a prescribed element, it means that another element can be further included instead of eliminating other elements as long as absence of special objection.

The following descriptions are applicable to various communication systems, which are capable of providing various communication services of audio data, packet data, and the like. The technology of the communication system is usable in DL (downlink) or UL (uplink). In this case, 'base station' can be replaced by such a terminology as a fixed station, a Node B, an eNode B (eNB), an access point, an ABS and the like. And, 'mobile station (MS)' can be replaced by such a terminology as a user equipment (UE), a subscriber station (SS), a mobile subscriber station (MSS), an AMS, a mobile terminal and the like.

A transmitting end means a node for transmitting data or audio service, and a receiving end means a node for receiving the data or audio service. Therefore, a mobile station becomes a transmitting end and a base station becomes a transmitting end, in uplink. Likewise, a mobile station becomes a receiving end and a base station becomes a receiving end, in downlink.

Meanwhile, a mobile station of the present invention can include a PDA (personal digital assistant), a cellular phone, a PCS (personal communication service) phone, a GSM (global system for mobile) phone, a WCDMA (wideband CMDA) phone, an MBS (mobile broadband system) phone or the like.

Embodiments of the present invention are supportable by standard documents disclosed in at least one of wireless access systems including IEEE 802 system, 3GPP system, 3GPP LTE system and 3GPP2 system. In particular, the steps or parts, which are not explained to clearly reveal the technical idea of the present invention, in the embodiments of the present invention can be supported by the above documents. Moreover, all terminologies disclosed in this document can be supported by at least one of P802.16-2004, P802.16e-2005, P802.16Rev2 and P802.16m documents which are the standards of IEEE 802.16 system.

In the following description, a preferred embodiment of the present invention is explained in detail with reference to the accompanying drawings. Detailed description disclosed together with the accompanying drawings is intended to explain not a unique embodiment of the present invention but an exemplary embodiment of the present invention. In the following description, specific terminologies used for embodiments of the present invention are provided to help the understanding of the present invention. And, the use of the specific terminology can be modified into another form within the scope of the technical idea of the present invention.

Basic principles of OFDM (orthogonal frequency division multiplexing), which are multi-carrier modulation scheme in wireless communication systems, are described as follows.

First of all, in OFDM system, a high-rate data stream is divided into a number of slow-rate data streams. This is to simultaneously transmit the data streams using a plurality of carriers. Each of a plurality of the carriers is called a subcarrier. Since orthogonality exists among a plurality of carriers in OFDM system, even frequency components of carriers are mutually overlapped with each other, they can be detected by a receiving end. A high-rate data stream is converted to a plurality of slow-rate data streams by a serial to parallel converter. A plurality of the data streams converted in parallel are multiplied by subcarriers, respectively and are then added together. The added data streams are transmitted to a receiving end.

A plurality of the parallel data streams generated by the serial to parallel converter can be carried on a plurality of subcarriers by IDFT (inverse discrete Fourier transform). In this case, it is able to efficiently implement the IDFT using IFFT (inverse fast Fourier transform). As a symbol duration of a slow-rate subcarrier increases, relative time-domain signal dispersion generated by multi-path delay spreading is reduced.

In wireless communication using this OFDM system, it is able to insert a guard interval longer than a delay spreading of channel between symbols in order to reduce inter-symbol interference. In particular, while each symbol is being transmitted on a multi-path channel, a guard interval longer than a maximum delay spread of channel is inserted between contiguous symbols. In doing so, in order to prevent inter-subcarrier orthogonality breakage, a signal in a last interval (i.e., a guard interval) of a useful symbol interval is copied and then inserted in a fore part of a symbol. This is called a cyclic prefix (hereinafter abbreviated CP).

Figure 5:
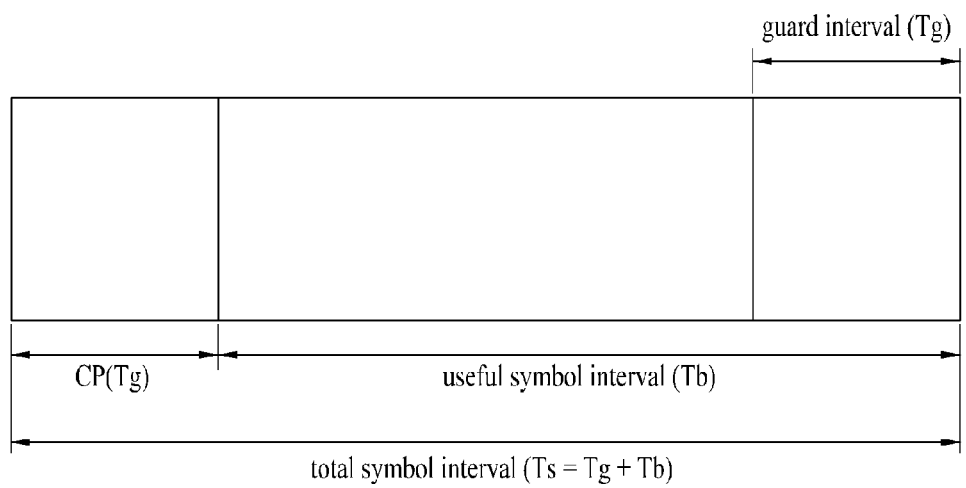
FIG. 5 is a diagram for an example of a symbol structure including a CP (cyclic prefix)

FIG. 5 is a diagram for an example of a symbol structure including a CP (cyclic prefix).

Referring to FIG. 5, a symbol duration Ts becomes a sum of a useful symbol interval Tb for carrying data actually and a guard interval Tg. A receiving end removes the guard interval and then performs demodulation by taking data for the useful symbol interval. A transmitting end and a receiving end may be synchronized with each other using a cyclic prefix code and the inter-data symbol orthogonality is maintained. In this case, a symbol of the present invention may be an OFDMA symbol.

In the following description, explained are frame structures (TDD frame and FDD frame) in 802.16m system with a CP length (hereinafter named a CP length of ¼ Tb) corresponding to ¼ of a useful symbol length on a channel bandwidth of 5 MHz, 10 MHz, 20 MHz. And, a TDD frame structure, which can mutually coexist with a TDD frame structure with a CP length of ⅛ or 1/16 Tb for the same channel bandwidth of 8.75 MHz, will be explained. Moreover, an FDD frame structure with many commonalities with a TDD frame structure proposed by the present invention is explained as well.

In IEEE 802.16m system, subframes of 4 kinds of types exist. Theses types can be defined as follows. First of all, a first type subframe is a subframe including 6 OFDMA symbols. A second type subframe is a subframe including 7 OFDMA symbols. A third type subframe is a subframe including 6 OFDMA symbols. And, a fourth type subframe is a subframe including 9 OFDMA symbols. In this case, the fourth type subframe may be used for a frame structure on 8.75 MHz channel bandwidth.

As shown in Table 1, 43 OFDMA symbols is available symbols in the frame structure for 5 MHz, 10 MHz, 20 MHz channel bandwidth with a CP length of ¼ Tb. Thus, for basic frame structure for 5 MHz, 10 MHz, 20 MHz channel bandwidth, the frame structure with the CP length of ¼ Tb may be constructed by using each type of subframes defined according to the number of symbols used to construct a subframe.

In case that a frame is constructed with 7 subframes in the same manner of the previous CP length of ⅛ or 1/16 Tb, one OFDMA symbol may be allocated to TTG and RTG interval in a TDD frame structure. And, the remaining 38 OFDMA symbols may be allocated to downlink and uplink. In this case, a TDD frame may include 3 first type subframes and 4 third type subframes.

Figure 6:
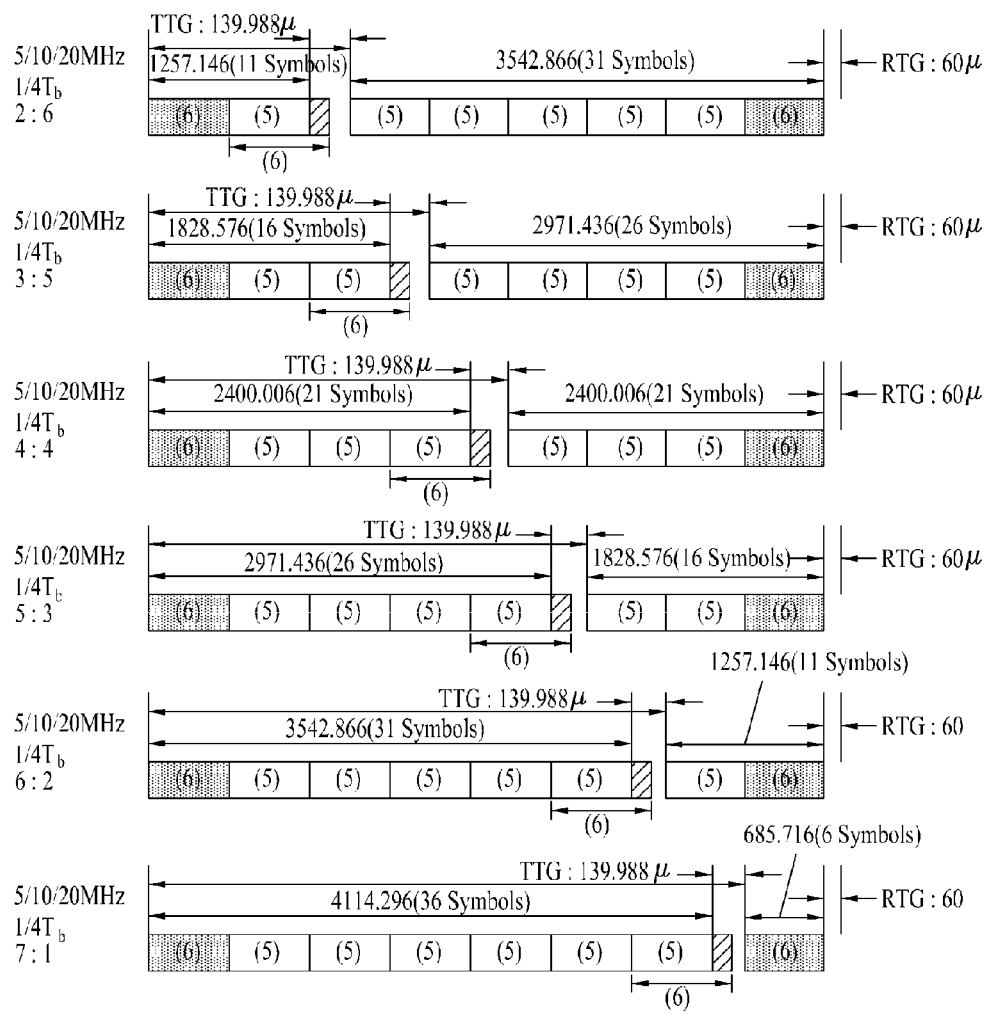
FIG. 6 is diagram for examples of a TDD frame structure for 5 MHz, 10 MHz, and 20 MHz channel bandwidth with a CP length of 1/4 Tb.
Figure 7:
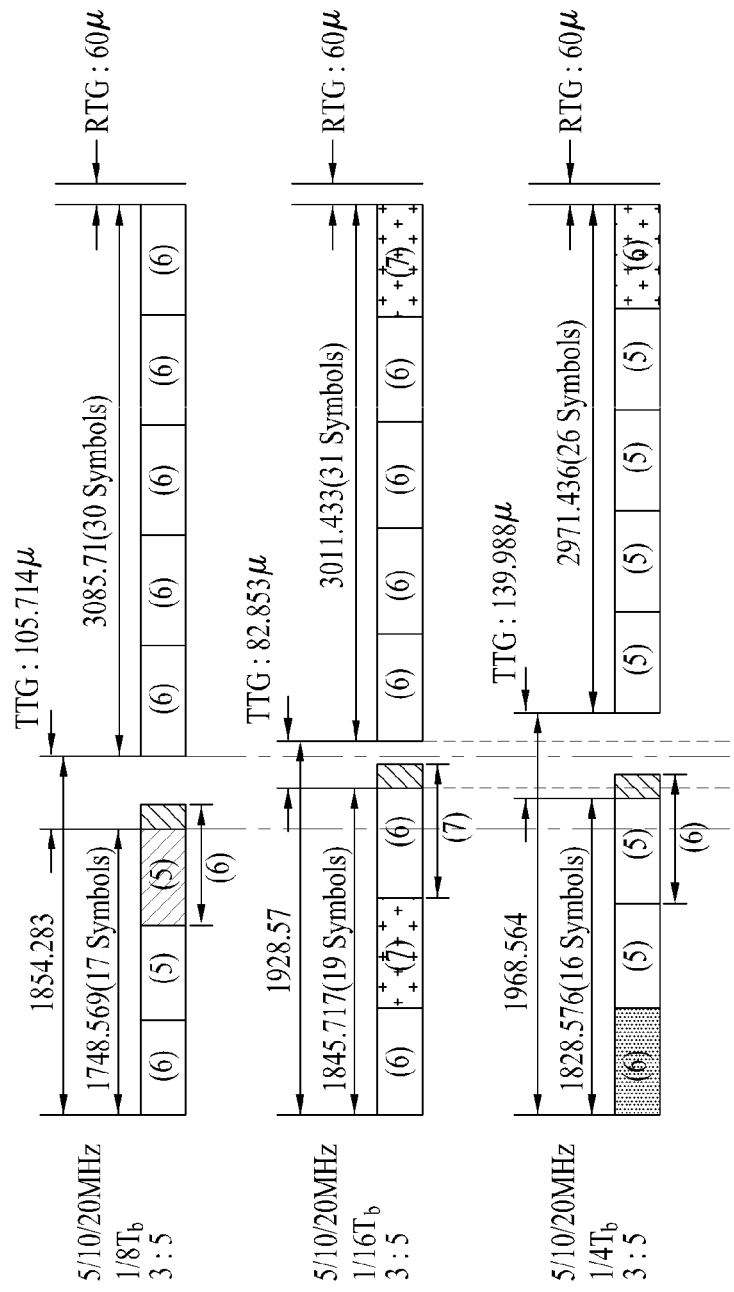
FIGS. 7 to 11 are diagrams for examples of a TDD frame structure with a CP length of 1/4 Tb, which can coexist together with another TDD frame structure with a different CP length, according to a ratio of the number of DL subframes to the number of UL subframes, respectively.
Figure 8:
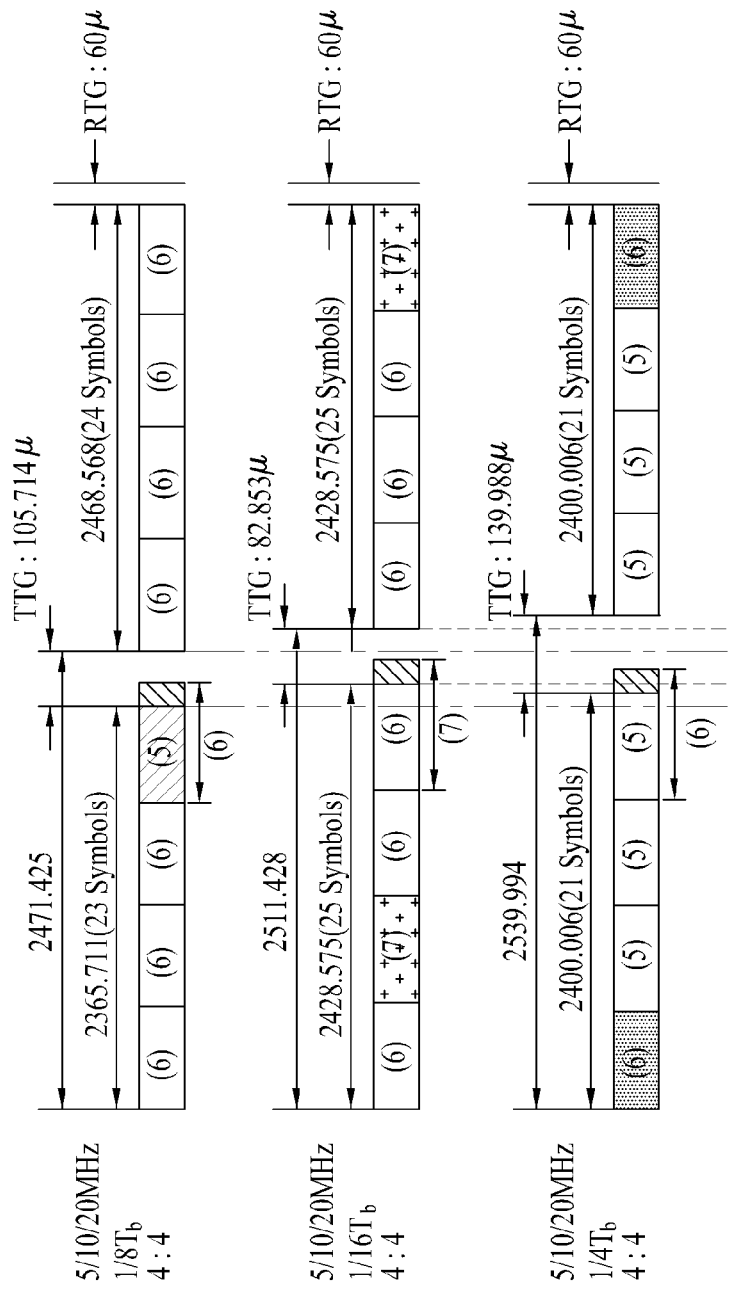
Figure 9:
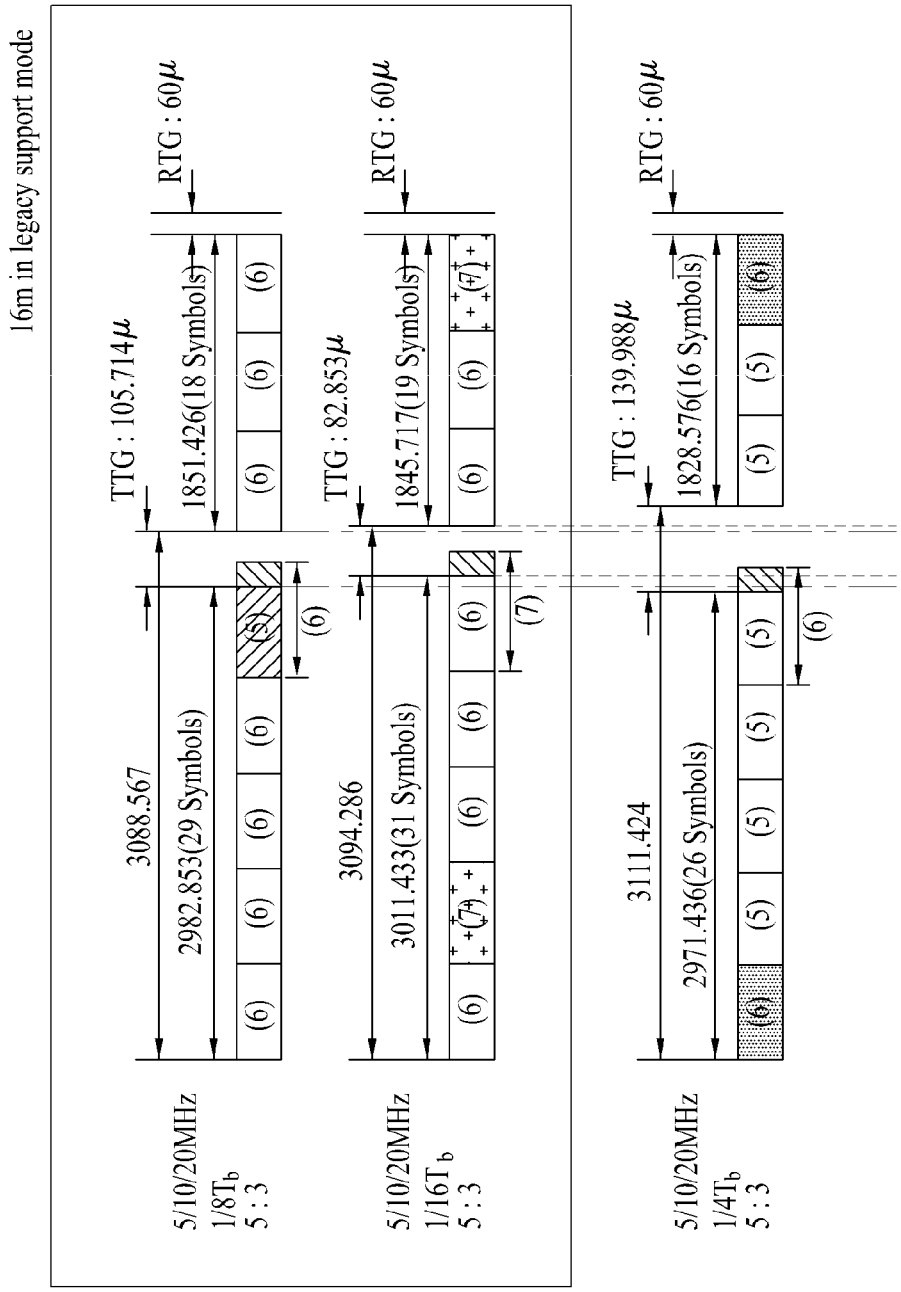
Figure 10:
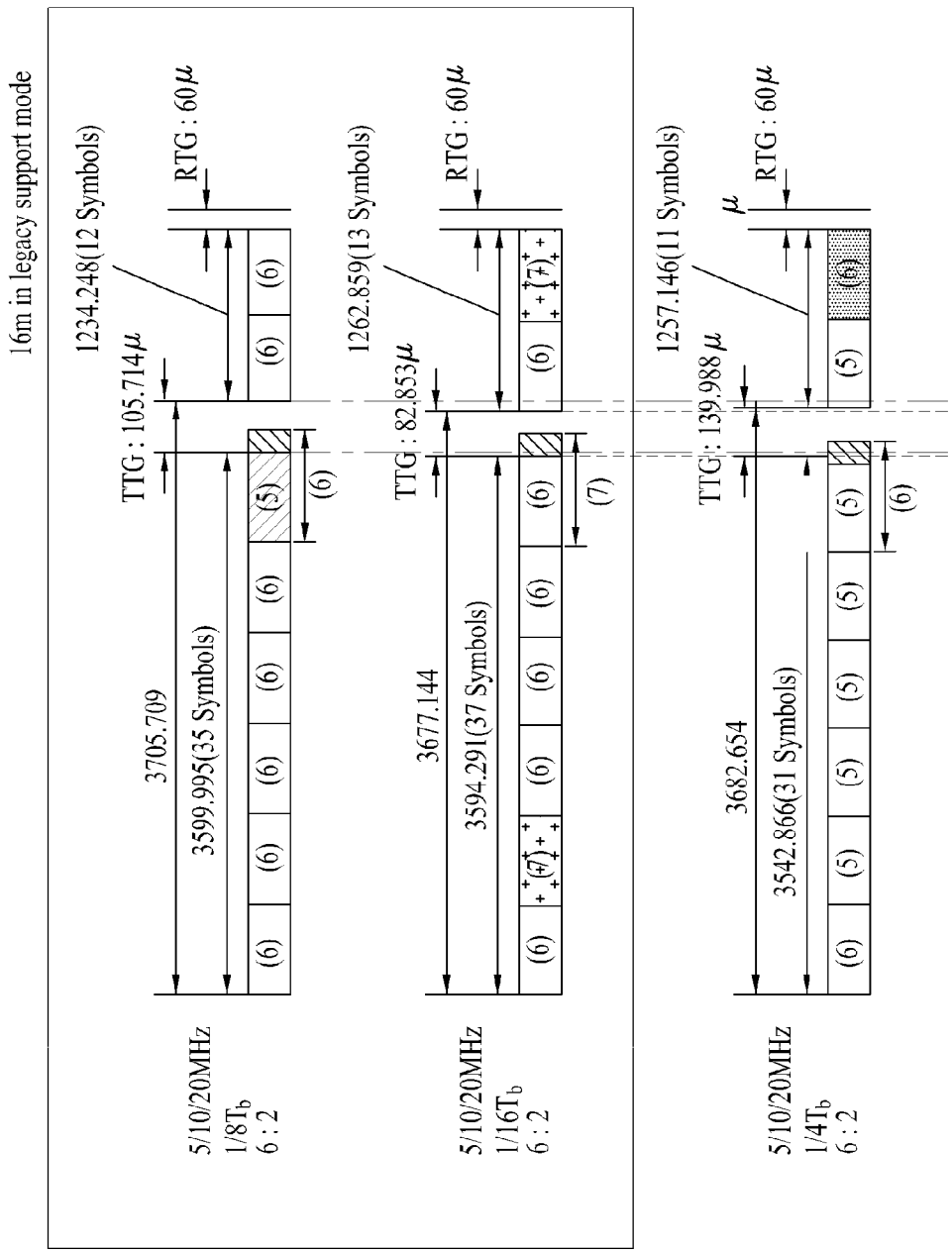
Figure 11:
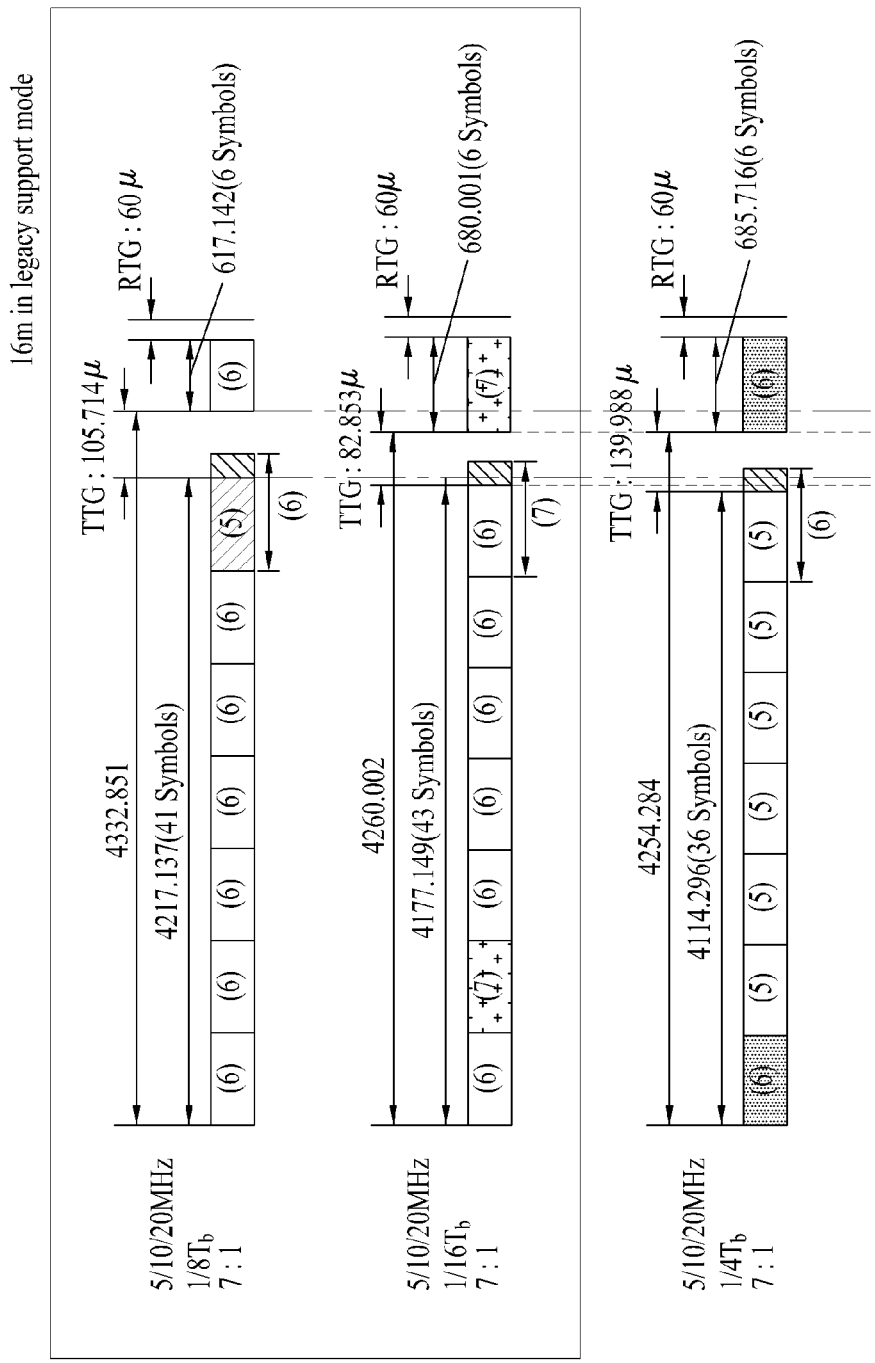

FIG. 6 is diagram for examples of a TDD frame structure for 5 MHz, 10 MHz, and 20 MHz channel bandwidth with a CP length of ¼ Tb.

Referring to FIG. 6, one frame may include 8 subframes and use 43 symbols. It may be considered that 43 symbols are used as a first type subframe and a third type subframe. One OFDMA symbol may be allocated as an idle interval of TTG/RTG in the TDD frame. Also, remaining 42 OFDMA symbols may be allocated and as 2 first type subframes and 6 third type subframes and used. If one symbol is used as idle interval is considered, the number of first type subframes used for constructing may be 3. Thus, it is not necessary that additional subframe is defined to configure frame.

That is, in case of TDD frame, 6 symbols may be allocated at a last downlink subframe. One symbol is allocated as idle interval of TTG/RTG so that the last downlink subframe becomes the third type subframe. The number of subframes in a frame is same with the number of subframes of a previous frame structure with different CP length (e.g., a CP length of ⅛ Tb, a CP length of 1/16 Tb, etc.), so HARQ (Hybrid Automatic Repeat reQuest) protocol designed for frame structure with different CP length or control information in unit of subframe may be adopted as same type.

In FIG. 6, a first type subframe is located in DL and UL intervals (regions), respectively. The location of the first type subframe in DL and UL is non-limited. For example, the first type subframes may be located at a first subframe or a last subframe in the frame.

As shown in FIG. 6, in one TDD frame including 8 subframes, a ratio of the number of available DL subframes to the number of available UL subframes for the TDD scheme is set to one of (2:6), (3:5), (4:4), (5:3), (6:2), and (7:1). If the ratio of the DL subframe number to the UL subframe number is (2:6), (3:5), (4:4), (5:3), (6:2), or (7:1), a ratio of the number of allocated symbol in the DL subframes to the number of allocated symbol in the UL subframes is (11:31), (16:26), (21:21), (26:16), (31:11) or (36:6), respectively. Since superframe header (SFH) is configured with 6 symbols, a first DL subframe is preferably a first type subframe. When the ratio of the DL subframe number to the UL subframe number is (2:6), (3:5), (4:4), (5:3), (6:2), or (7:1), a frame structure may be designed to prevent interference generation at a DL/UL switching point that 5*k+1 (k=the number of DL subframes) OFDMA symbols and 5*j+1 (j=the number of UL subframes) OFDMA symbols may be allocated to DL interval and UL interval, respectively.

FIGS. 7 to 11 are diagrams for examples of a TDD frame structure with a CP length of ¼ Tb, which can coexist together with another TDD frame structure with a different CP length, according to a ratio of the number of DL subframes to the number of UL subframes, respectively.

Referring to FIGS. 7 to 11, a ratio of the number of DL subframes to the number of UL subframes is set to (3:5), (4:4), (5:3), (6:2), or (7:1), respectively. If the ratio of the number of DL subframes to the number of UL subframes is set to (3:5), (4:4), (5:3), (6:2), or (7:1), respectively, a ratio of the number of allocated symbol in the DL subframes to the number of allocated symbol in the UL subframes is (16:26), (21:21), (26:16), (31:11) or (36:6), respectively. A last DL subframe located in an interval for switching from DL to UL may be a first type subframe constructed with 6 symbols by including idle interval. However, in order to generate a time delay necessary for TTG interval in the TDD frame structure, a third type subframe constructed with 5 symbols may be located at the last DL subframe by allocating one symbol of a last DL subframe to an idle interval. One symbol may be allocated as idle interval of TTG/RTG in the TDD frame. This configuration is applicable irrespective of the ratio of the DL subframe number to the UL subframe number. That is, this configuration is applicable to the ratio in shown in FIGS. 7 to 11, respectively.

As shown in FIGS. 7 to 11, the first type subframe is located at downlink and uplink, respectively to solve problem of interference generation at DL/UL switching point.

Also, a third type subframe is located at a last downlink subframe in a frame structure with a CP length of ¼ Tb so that the frame structure with a CP length of ¼ Tb can coexist together with a frame structure with a CP length of ⅛ Tb and a frame structure with a CP length of 1/16 Tb.

Figure 12:
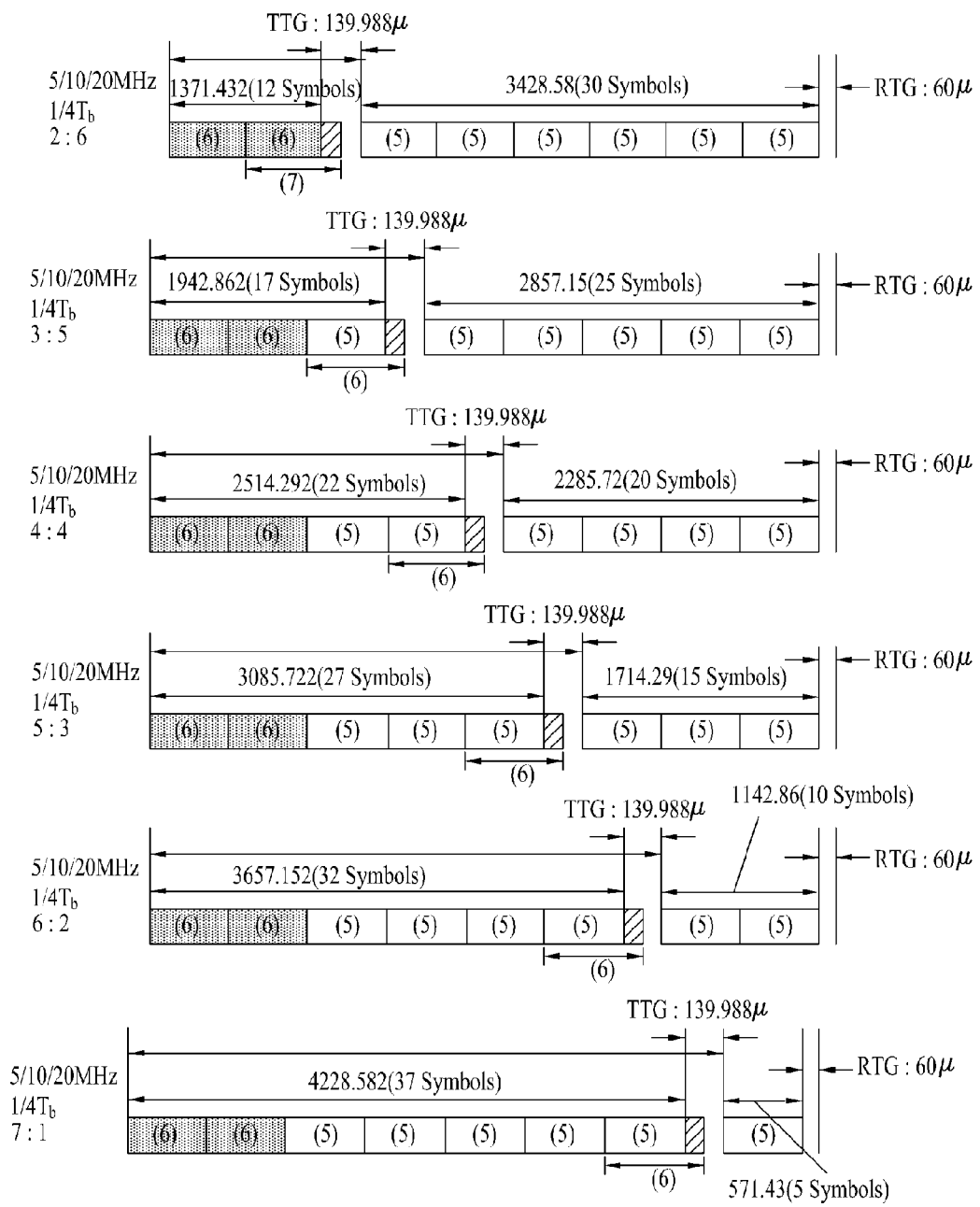
FIG. 12 is a diagram for examples of a TDD frame structure with a CP length of 1/4 Tb.

FIG. 12 is a diagram for examples of a TDD frame structure with a CP length of ¼ Tb.

A first type subframe is located at a last uplink subframe in the FIG. 6. However, FIG. 12 shows a structure that a last uplink subframe is shifted to a downlink interval. That is, a frame structure may be designed as 2 first type subframes may be located at the downlink interval. In this case, a location of 2 first type subframes in the downlink interval is non-limited. More particularly, 2 first type subframes may be located at a first subframe and a second subframe in the downlink interval. In order to use previous defined super frame header (SFH), at least 1 first type subframe is preferably located at a first subframe in a frame.

If a ratio of the number of DL subframes to the number of UL subframes is set to (2:6), the first type subframe may be located at a DL/UL switching point. However, If the ratio of the DL subframe number to the UL subframe number is set to (3:5), (4:4), (5:3), (6:2) or (7:1), respectively, a third type subframe may be located at the DL/UL switching point.

In the FIG. 12, location of 2 first type subframe in the downlink interval is not limited. For example, as described above, the first type subframe may be located at a first subframe and a second subframe in downlink subframes. In this case, 5*k+2 (k=the number of DL subframes) OFDMA symbols and 5*j (j=the number of UL subframes) OFDMA symbols may be allocated to DL region and UL region, respectively. And, one symbol may be allocated as idle interval of TTG/RTG in the TDD frame.

Figure 13:
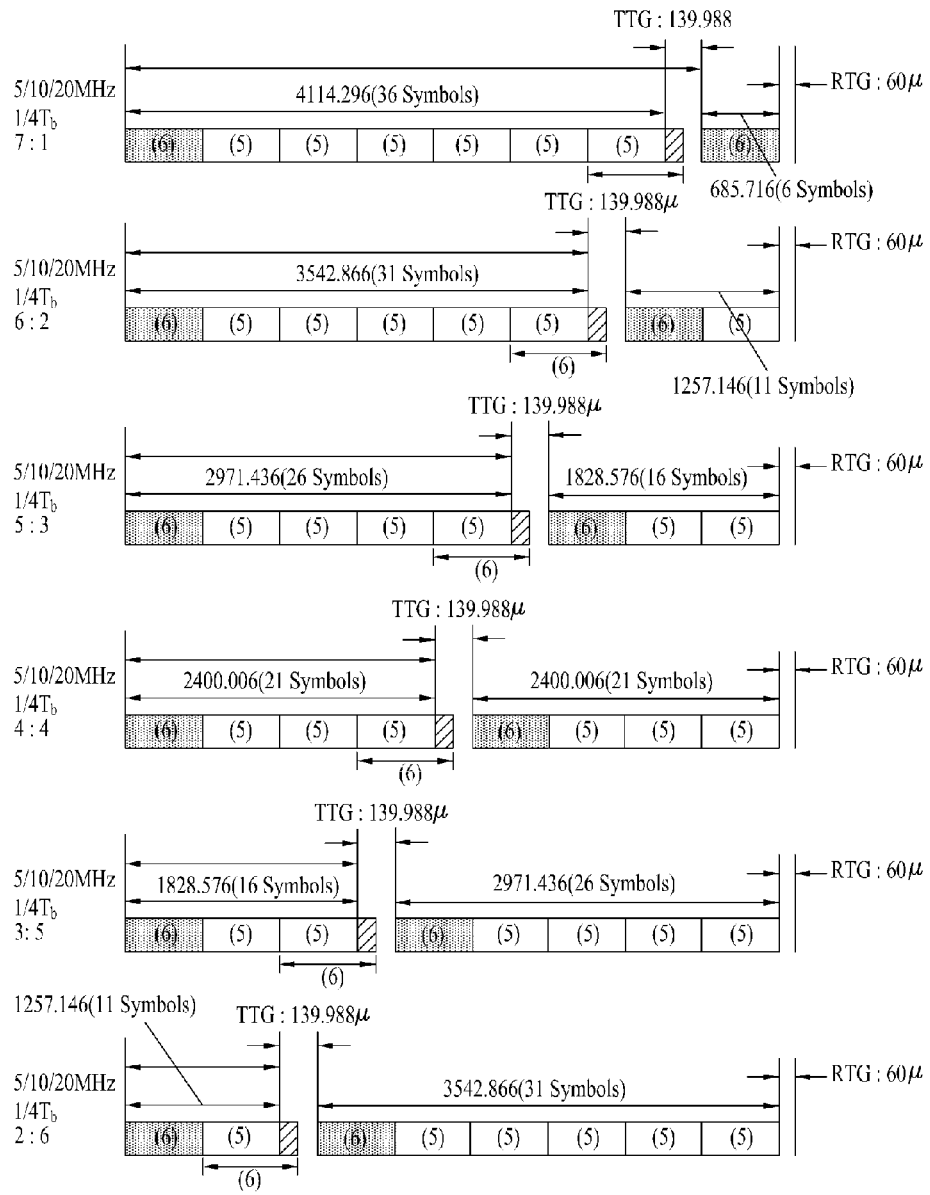
FIG. 13 is a diagram for an example of an TDD frame structure with a CP length of 1/4 Tb.
Figure 14:
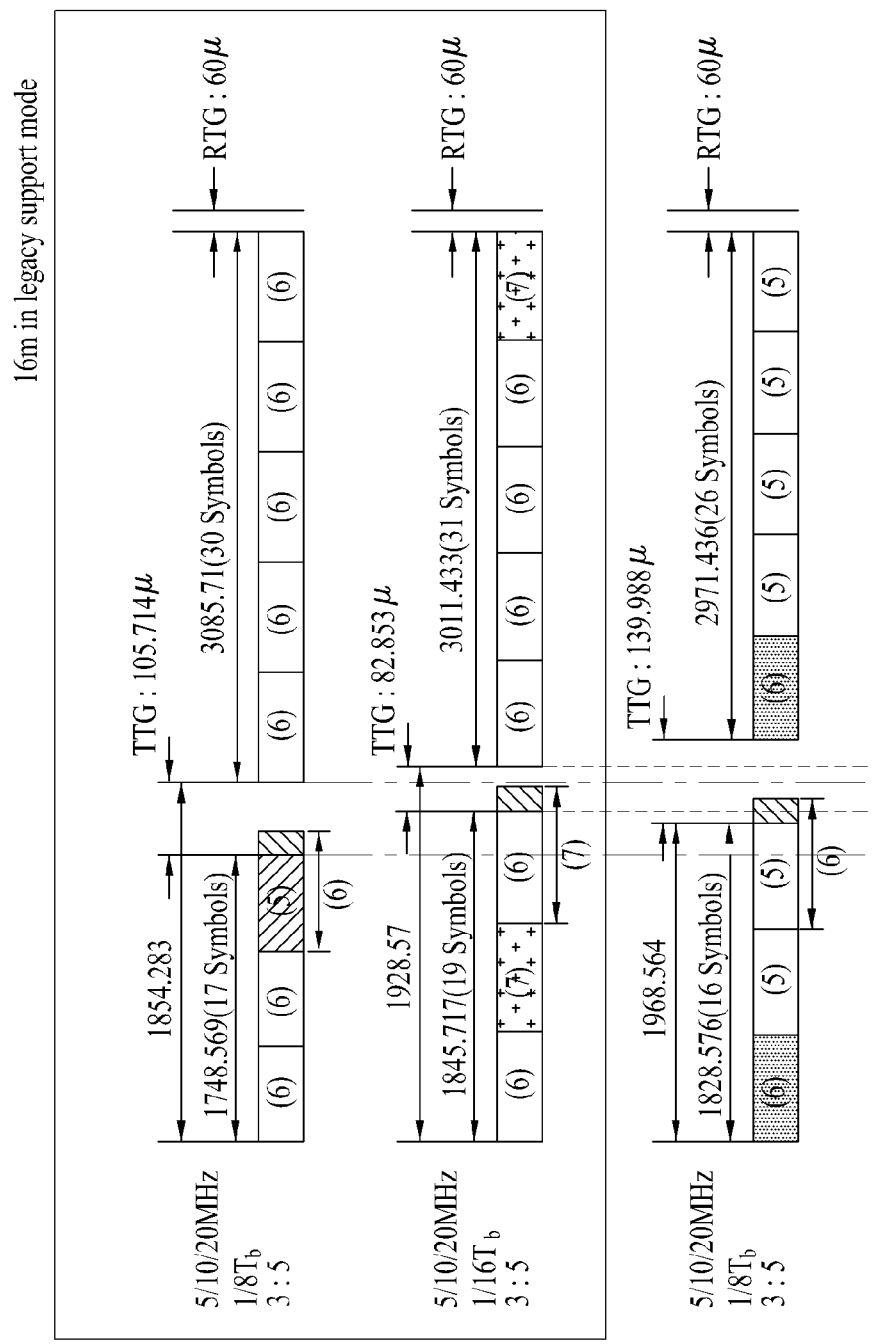
FIGS. 14 to 17 are diagrams for examples of a TDD frame structure with a CP length of 1/4 Tb, which can coexist together with another TDD frame structure with a different CP length, according to a ratio of the number of DL subframes to the number of UL subframes, respectively.
Figure 15:
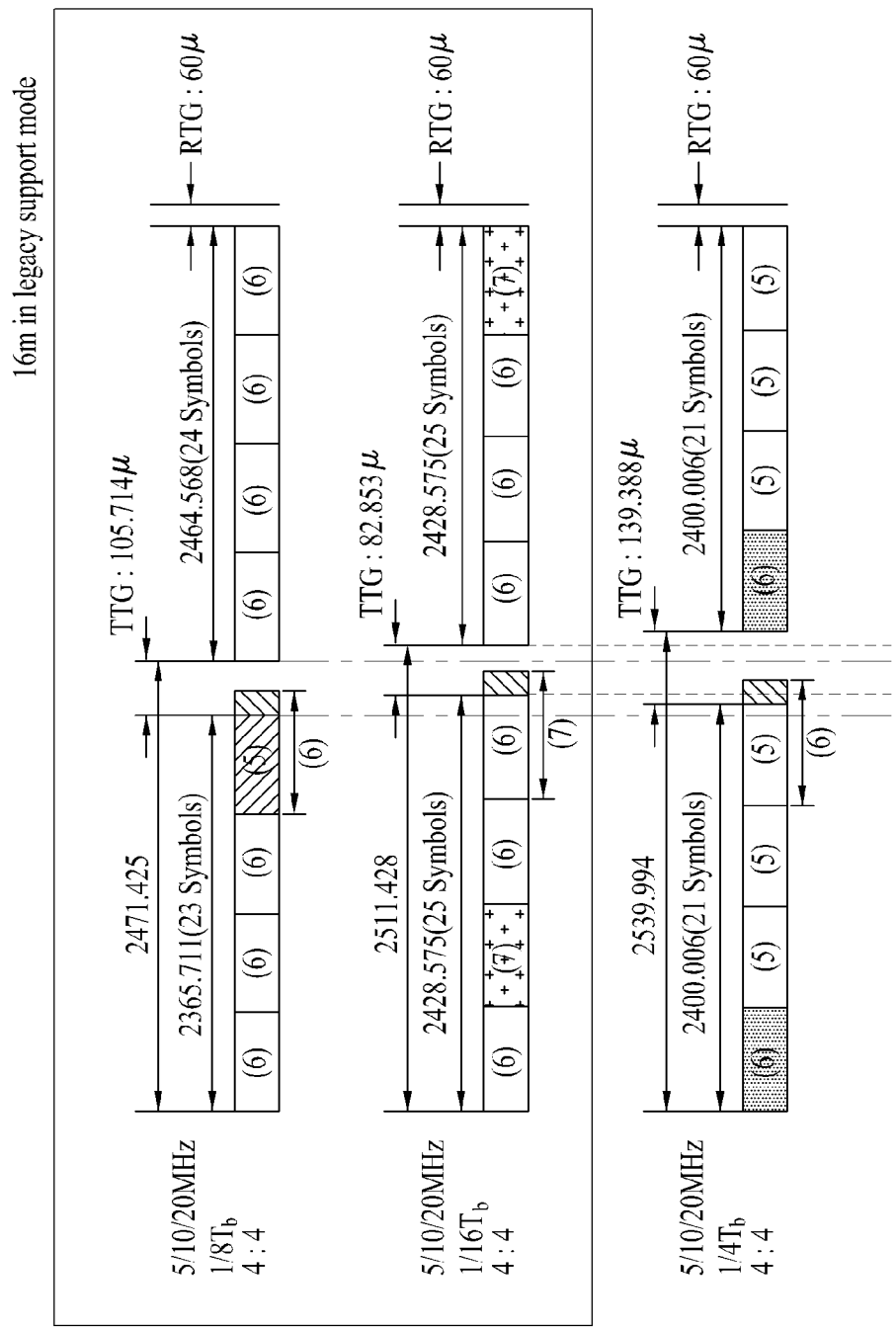
Figure 16:
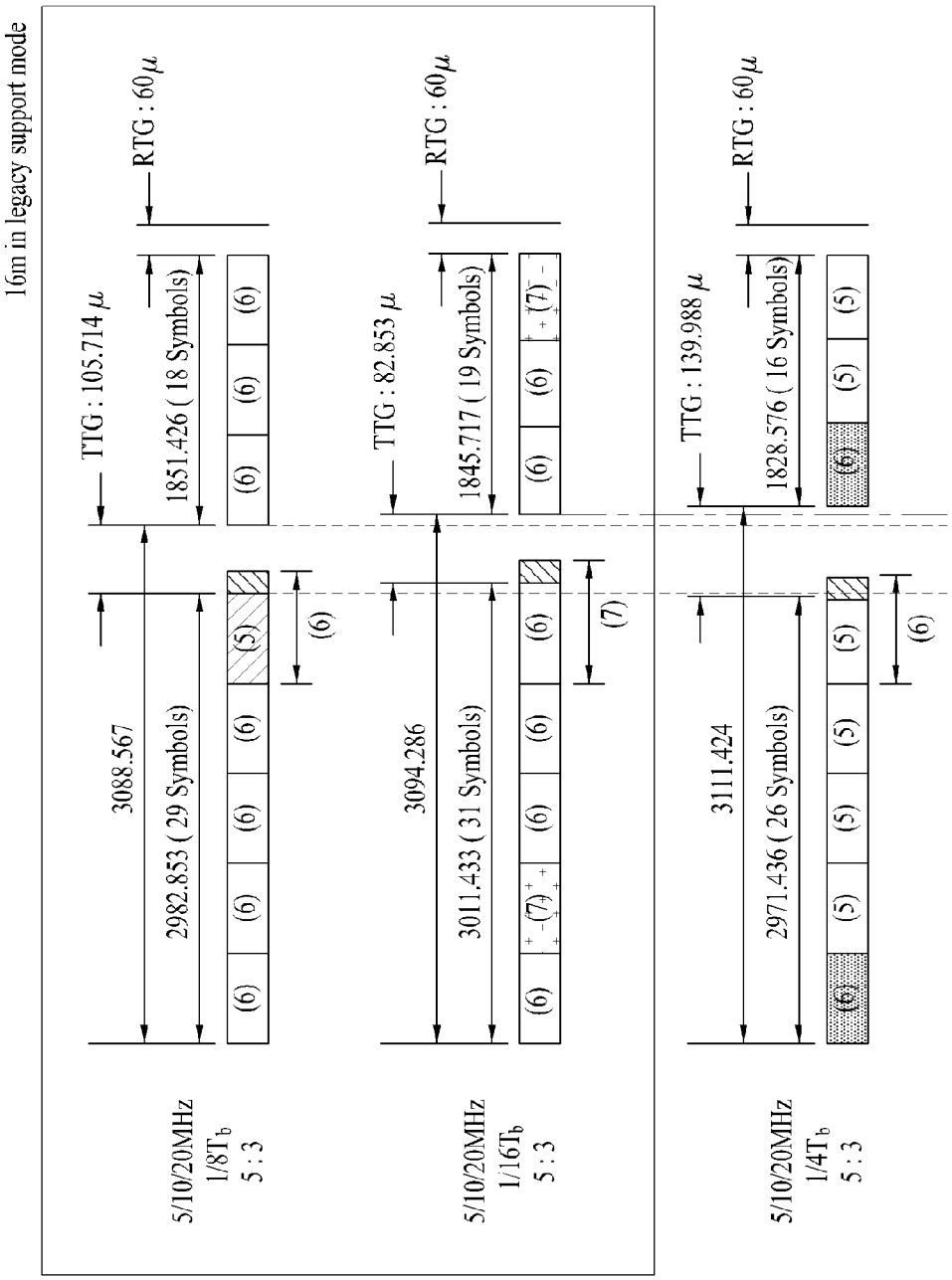
Figure 17:
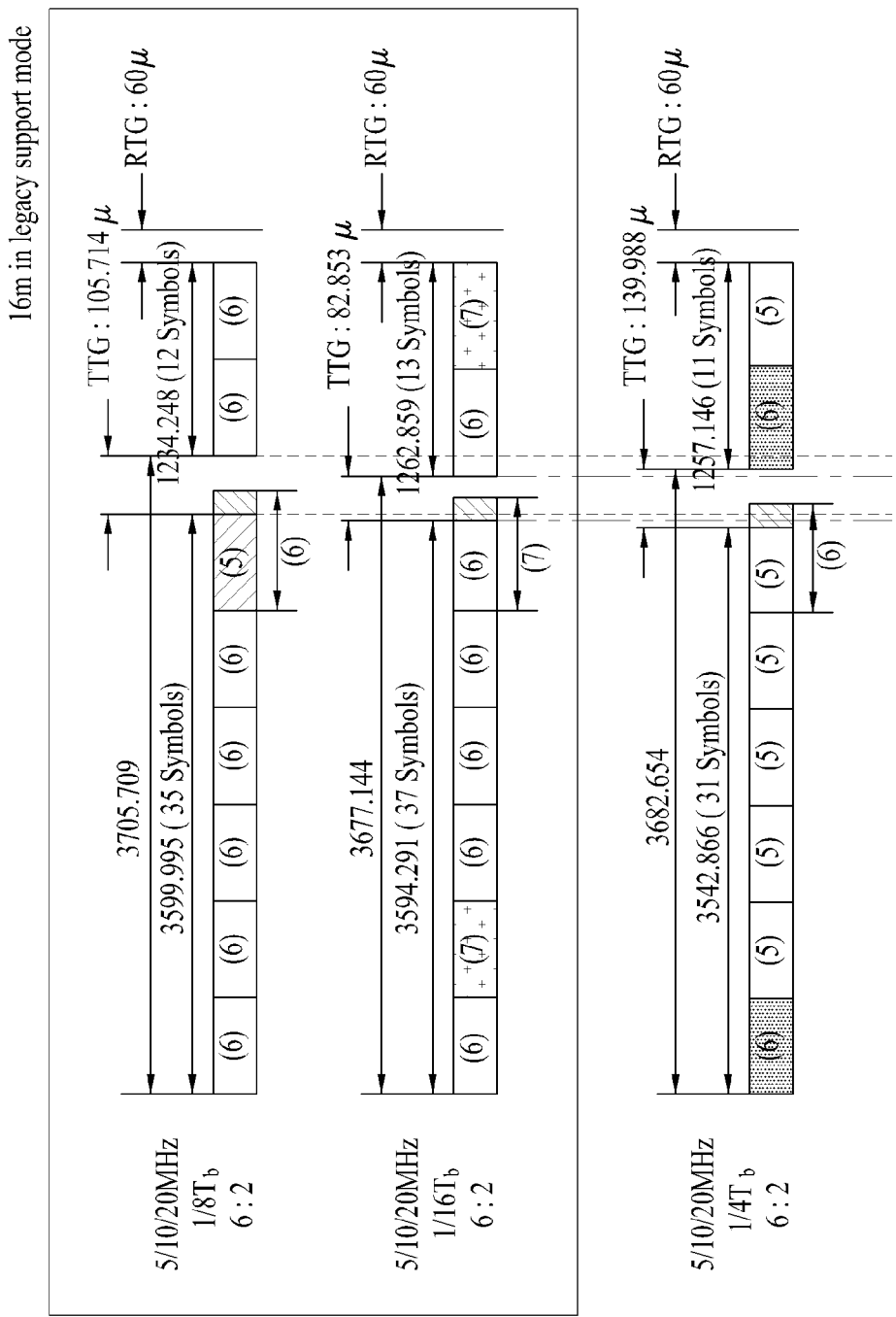

FIG. 13 is a diagram for examples of a TDD frame structure with a CP length of ¼ Tb.

Referring to FIG. 13, a first type subframe may be located at a first subframe of a downlink region and an uplink region, respectively. In other words, downlink subframe and uplink subframe begin with the first type subframe. Thus, starting point of the downlink region and uplink region may be grasped by using location of the first type subframe. In the TDD frame structure shown in the FIG. 13, when the ratio of the DL subframe number to the UL subframe number is set to (7:1), (6:2), (5:3), (4:4), (3:5), or (2:6), respectively, a ratio of the number of allocated symbol in the DL subframes to the number of allocated symbol in the UL subframes is (36:6), (31:11), (26:16), (21:21), (16:26), or (11:31), respectively.

FIGS. 14 to 17 are diagrams for examples of a TDD frame structure with a CP length of ¼ Tb, which can coexist together with another TDD frame structure with a different CP length, according to a ratio of the number of DL subframes to the number of UL subframes, respectively.

In the TDD frame structure shown in FIGS. 14 to 17, a third type subframe including 5 symbols may be located at a last downlink subframe for switching interval from DL to UL. This configuration is applicable irrespective of a ratio of the number of DL subframes to the number of UL subframes. 6+5*k OFDMA symbols (k=the number of third type subframes allocated in DL subframes) and 6+5*n OFDMA symbols (n=the number of third type subframes allocated in UL subframes) may be allocated to DL region and UL region, respectively.

In the TDD frame structure shown in FIGS. 14 to 17 like the TDD frame structure shown in FIGS. 7 to 11, a ratio of the number of DL subframes to the number of UL subframes may be set to (3:5), (4:4), (5:3), (6:2), or (7:1), respectively. A last DL subframe located in an interval for switching from DL to UL may be constructed with 6 symbols by including idle interval in the TDD frame structure with a cp length of ¼ Tb. However, in order to generate a time delay necessary for TTG interval in the TDD frame structure, a third type subframe constructed with 5 symbols by allocating one symbol to an idle interval may be located at the last DL subframe. One symbol may be allocated as idle interval of TTG/RTG in the TDD frame. This configuration is applicable irrespective of the ratio of the DL subframe number to the UL subframe number.

If a first type subframe is located at a downlink region and an uplink region, respectively, it is able to solve interference generation at a DL/UL switching point. Thus, TDD frame structure with a cp length of ¼ Tb shown in the FIGS. 14 to 17 can coexist together with previous TDD frame structure with a cp length of ⅛ Tb or a cp length of 1/16 Tb.

Figure 18:
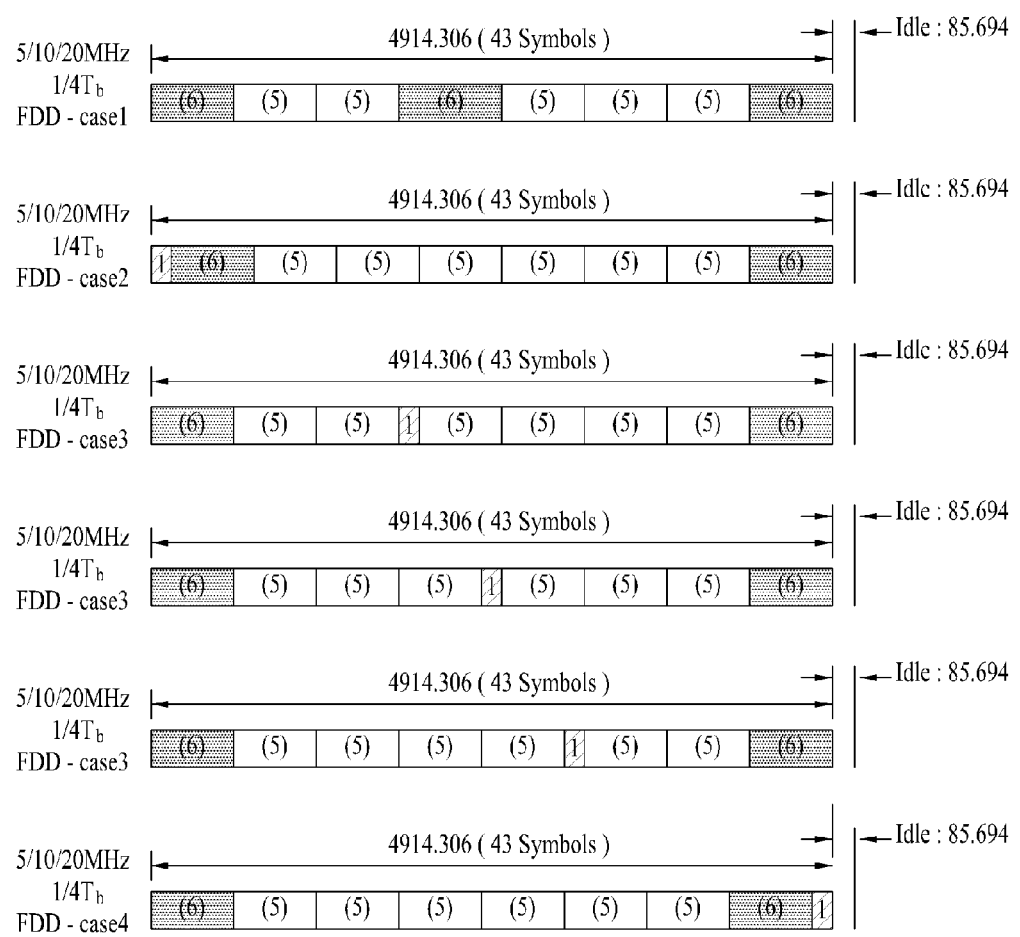
FIG. 18 is a diagram for an example of a FDD frame structure with a CP length of 1/4 Tb.

FIG. 18 is a diagram for examples of a FDD frame structure with a CP length of ¼ Tb.

The FDD frame structure shown in the FIG. 18 is frame structure corresponding to the TDD frame structure shown in the FIGS. 6 to 11. 43 OFDMA symbols may be allocated to the FDD frame. The FDD frame may include 8 subframes. Also, the FDD frame may include 2 first type subframes. Since the FDD frame structure has not TTG/RTG interval unlike TDD frame structure, the FDD frame structure may further utilize one symbol compared to TDD frame structure. Various Methods for using the additional one symbol will be described.

As a first case (FDD case 1) shown in FIG. 18, it is considered that a first type subframe is configured by adding the one symbol to 1 third type subframe among a plurality of third type subframes in a frame. In consideration of the H-FDD frame structure and two groups, since there is a quite possibility that idle interval symbol is located at center of the FDD frame, the subframe including added one symbol is preferably located at a fourth subframe in the FDD frame. This is just an example of FDD frame structure with a cp length of ¼ Tb, location of the subframe including added one symbol is non-limited in the FDD frame structure.

As a second case (FDD case 2), the additional one symbol may be allocated to a first subframe in the FDD frame. Since symbol located at a front of the FDD frame need further control information in unit of symbol (e.g., preamble, frame control header (FCH)), added symbol may be used for the control information, a first type subframe may be configured and used for data transmission.

As a third case (FDD case 3), in consideration of the H-FDD frame structure or mid-amble in a frame, one symbol may independently or additionally be located next to a third subframe in the frame. Additional one symbol may be located next to a third subframe, a fourth subframe, or a fifth subframe in the frame. This is just exemplary, the location of additional one symbol is non-limited in the FDD frame structure.

As a fourth case (FDD case 4), the additional one symbol may be allocated next to a last subframe of the FDD frame. In doing so, additional information such as sounding may be transmitted by using a previous subframe structure without modification of subframe structure for data transmission.

Figure 19:
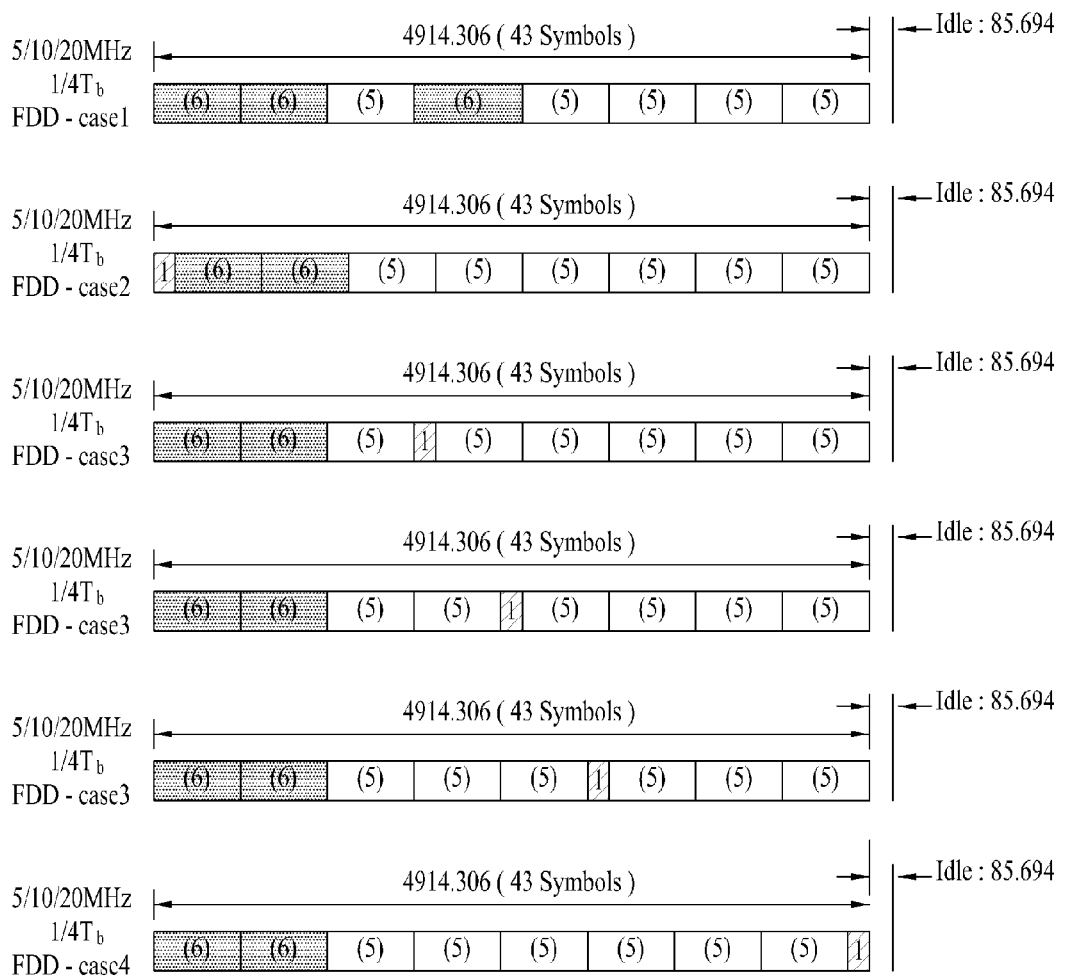
FIG. 19 is a diagram for an example of an FDD frame structure with a CP length of 1/4 Tb.

FIG. 19 is a diagram for examples of a FDD frame structure with a CP length of ¼ Tb.

The FDD frame structure shown in the FIG. 19 is frame structure corresponding to the TDD frame structure shown in the FIGS. 12 to 17. 43 OFDMA symbols may be allocated to the FDD frame. FIG. 19 shows FDD frame including subframes constructed with a first type subframe and a third type subframe according to a ratio of the number of first type subframes to the number of third type subframes shown in the FIG. 18, respectively.

The FDD frame may include 2 or 3 first type subframes. More particularly, the first type subframe may be located at a first subframe or a second subframe in the FDD frame. Also, the first type subframe may be located at a fourth subframe like above described FDD case 1. 1 first type subframe may be located at the first subframe, location of remaining 2 first type subframes is non-limited.

Figure 20:
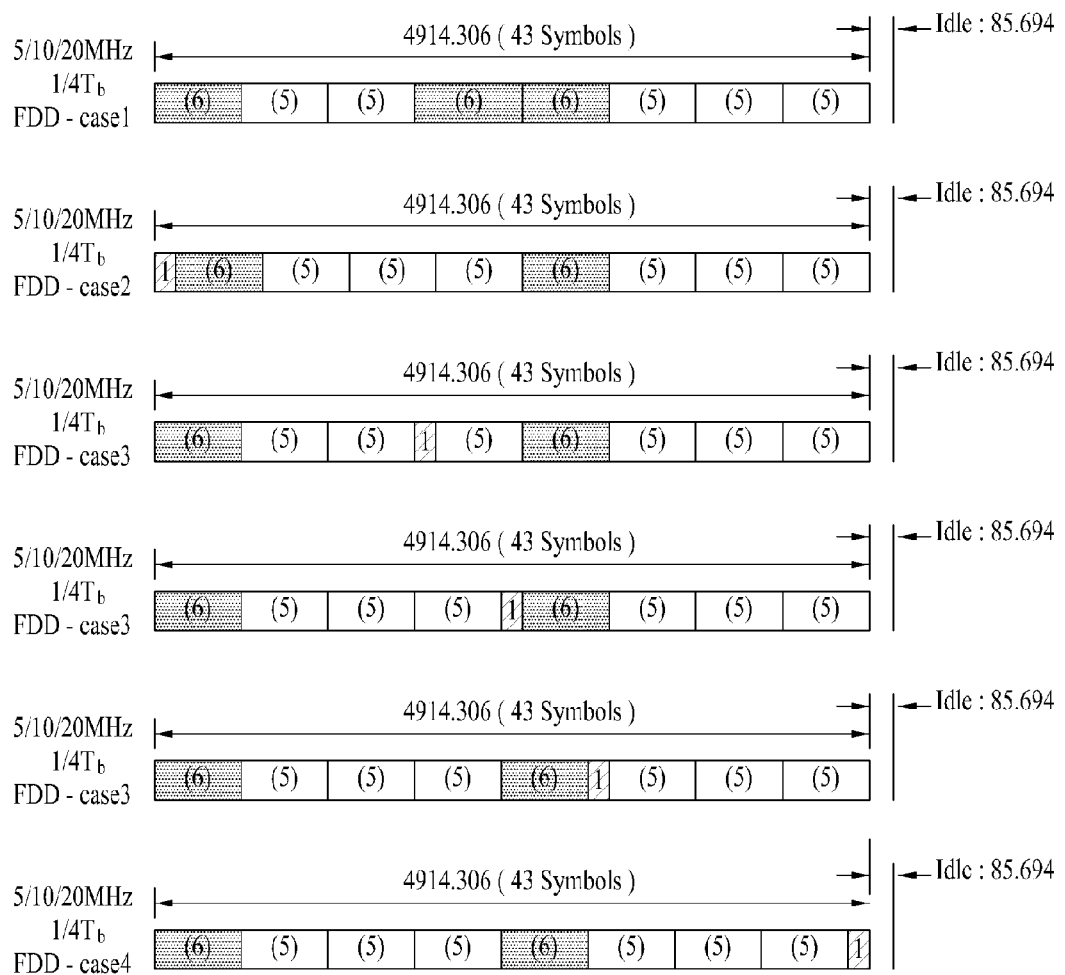
FIG. 20 is a diagram for an example of a FDD frame structure with a CP length of 1/4 Tb.

FIG. 20 is a diagram for examples of a FDD frame structure with a CP length of ¼ Tb.

The FDD frame structure shown in the FIG. 20 is frame structure corresponding to the TDD frame structure which a first type subframe is located at a first DL subframe and a first UL subframe. 43 OFDMA symbols may be allocated to the FDD frame. FIG. 20 shows FDD frame structure that the first type subframe is located in a FDD frame in same manner of the FDD frame structure shown in the FIG. 18.

As a first case (FDD case 1) shown in FIG. 20, the first subframe may be located at a first subframe, a fourth subframe, a fifth subframe in the FDD frame. As a second to fourth case (FDD case 2 to 4), the first subframe may be located at the first subframe, the fifth subframe in the FDD frame. A location of the first type subframe is just exemplary. The location of the first type subframe in the FDD frame is non-limited. Preferably, 1 first type subframe is located at the first subframe in the FDD frame in order to use previous defined super frame header (SFH) including 6 symbols.

The proposed FDD frame structure has commonality with basic frame structure for 5 MHz, 10 MHz, 20 MHz channel bandwidth and a previous defined frame structure with different cp length (e.g, a CP length of ⅛ Tb or a CP length of 1/16 Tb). The proposed FDD frame structure has commonality with TDD frame structure for 5 MHz, 10 MHz, 20 MHz channel bandwidth with a CP length of ¼ Tb which can remove interference caused at a DL/UL switching point and with previous defined frame structure with a CP length of ⅛ Tb or 1/16 Tb. Thus, the proposed FDD frame structure can coexist together with frame with previous defined different CP length.

Figure 21:
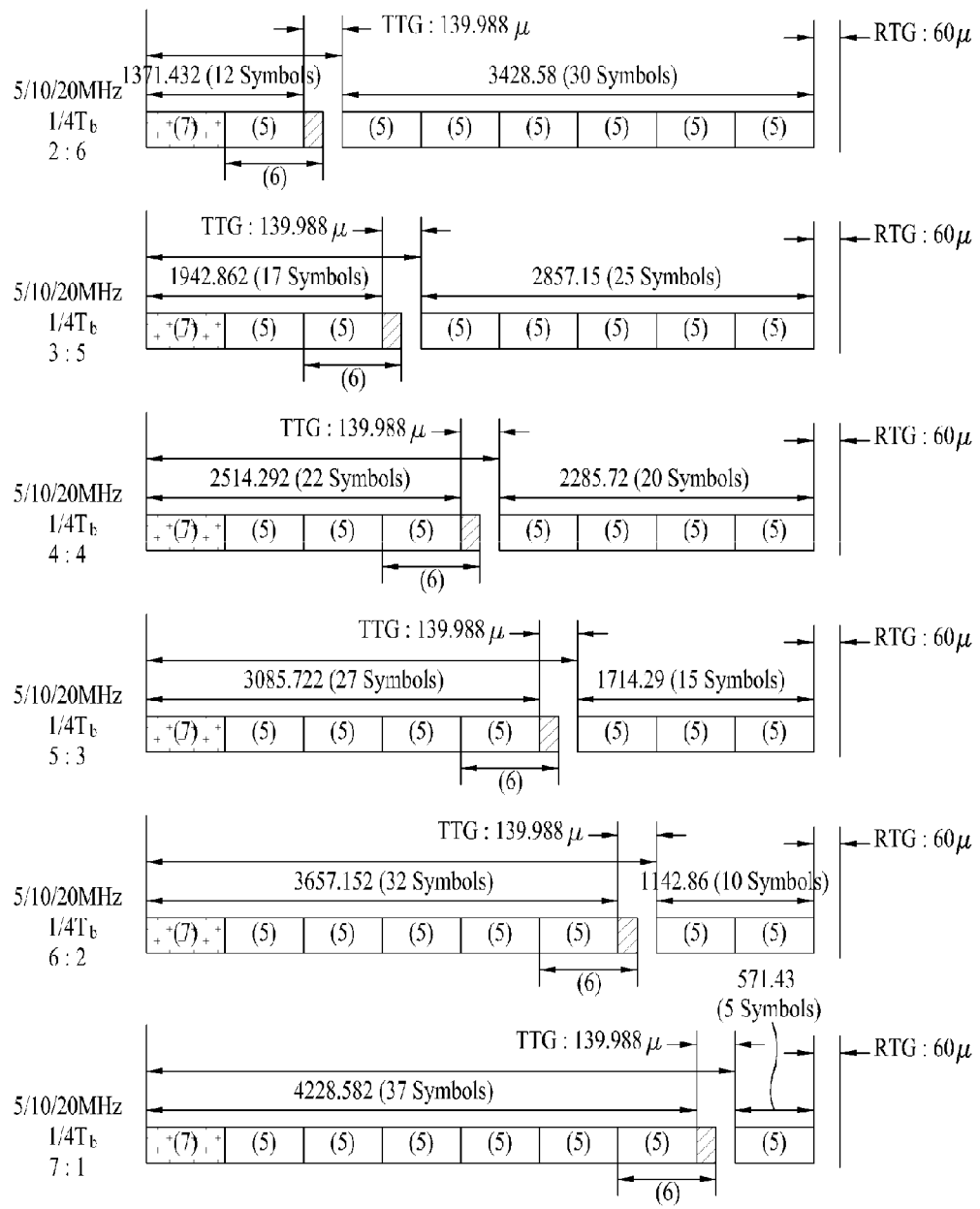
FIG. 21 is a diagram for an example of a TDD frame structure with a CP length of 1/4 Tb.

FIG. 21 is a diagram for examples of a TDD frame structure with a CP length of ¼ Tb.

Referring to the FIG. 21, as a second case for constructing 8 subframes, 43 symbols may be used to configure a second type subframe and a third type subframe. One symbol may be allocated to an idle interval of TTG/RTG in the TDD frame. Other symbols (42 symbols) may be used to transmit data.

Each of subframe may be configured with a third type subframe including 5 symbols, in this case, 2 symbols remains. The remained 2 symbols may be configured to add the third type subframe. A second type subframe is constructed by adding 2 symbols to 1 third type subframe.

Therefore, one frame may include 7 third type subframes and 1 second type subframe. In consideration of control information in unit of symbol (e.g., preamble, frame control header (FCH)) transmitted at a front of the frame, 1 second type subframe preferably is located at a first subframe in the frame.

As shown in FIG. 21, a ratio of the number of available DL subframes to the number of available UL subframes in the TDD frame is set to one of (2:6), (3:5), (4:4), (5:3), (6:2), and (7:1). 5*k+2 OFDMA symbols (k=the number of DL subframes) are allocated to DL interval and 5*j OFDMA symbols (j=the number of UL subframes) are allocated to UL interval. A third type subframe may be located at DL/UL switching interval.

As described above, FIG. 21 shows TDD frame structure according to a ratio of the number of DL subframes to the number of UL subframes. The second type subframe may be located at a first subframe in the TDD frame. This is just exemplary, location of the second type subframe in the DL region is not-limited. The second type subframe may be used at the DL/UL switching interval. Thus, the location of the second type subframe is non-limited.

Figure 22:
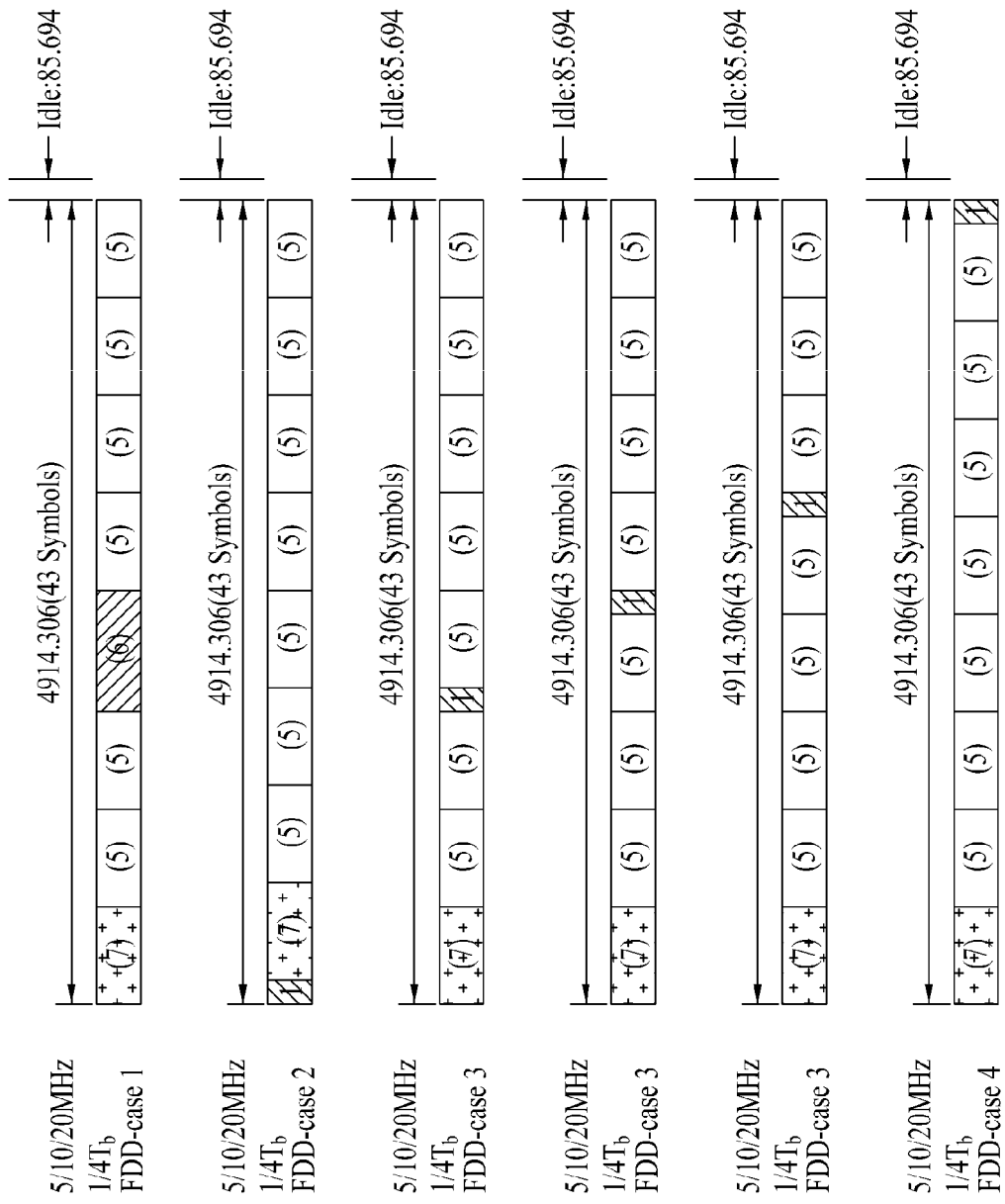
FIG. 22 is a diagram for an example of a FDD frame structure with a CP length of 1/4 Tb.

FIG. 22 is a diagram for examples of a FDD frame structure with a CP length of ¼ Tb.

The FDD frame structure shown in the FIG. 22 is frame structure corresponding to the TDD frame structure shown in the FIG. 21. 43 OFDMA symbols may be allocated to the FDD frame. The FDD frame may include 8 subframes. Each of 8 subframes is configured as a first type subframe, a second type subframe, or a third type subframe. Since the FDD frame structure has not TTG/RTG interval unlike TDD frame structure, the FDD frame structure may further utilize one symbol, compared to TDD frame structure. Various Methods for using the additional one symbol exist.

As a first case (FDD case 1), a first type subframe may be configured by adding one symbol to one third type subframe among a plurality of third type subframes in a frame. In consideration of the H-FDD frame structure and two groups, there is a quite possibility that idle symbol is located at center of the FDD frame, the subframe including additionally allocated one symbol or a second type subframe is preferably located at a first subframe in the FDD frame. However, this is just exemplary of FDD frame structure with a CP length of ¼ Tb according to the present invention. The first type subframe constructed by adding one symbol and the second type subframe may be randomly located in the FDD frame structure.

As a second case (FDD case 2), the additional one symbol is allocated to a first subframe in the FDD frame so that the additional one symbol is located at a front of the FDD frame. Since symbol located at a front of the FDD frame need further control information in unit of symbol (e.g., preamble, frame control header (FCH)), added symbol may be used for the control information, a second type subframe or a third type subframe may be used for data transmission.

As a third case (FDD case 3), in consideration of the H-FDD frame structure or mid-amble in a frame, one symbol may independently or additionally be located next to a third subframe, a fourth subframe, or a fifth subframe in the frame. This is just exemplary, the location of additional one symbol is non-limited in the FDD frame structure.

As a fourth case (FDD case 4), one symbol may be allocated next to a last subframe of the FDD frame. In doing so, additional information such as sounding may be transmitted by using a previous subframe structure for data transmission without modification of the previous subframe structure.

Also, as shown in the FIG. 22, even a second type subframe is located at a first subframe in the FDD frame, location of the second type subframe in the FDD frame is non-limited.

Figure 23:
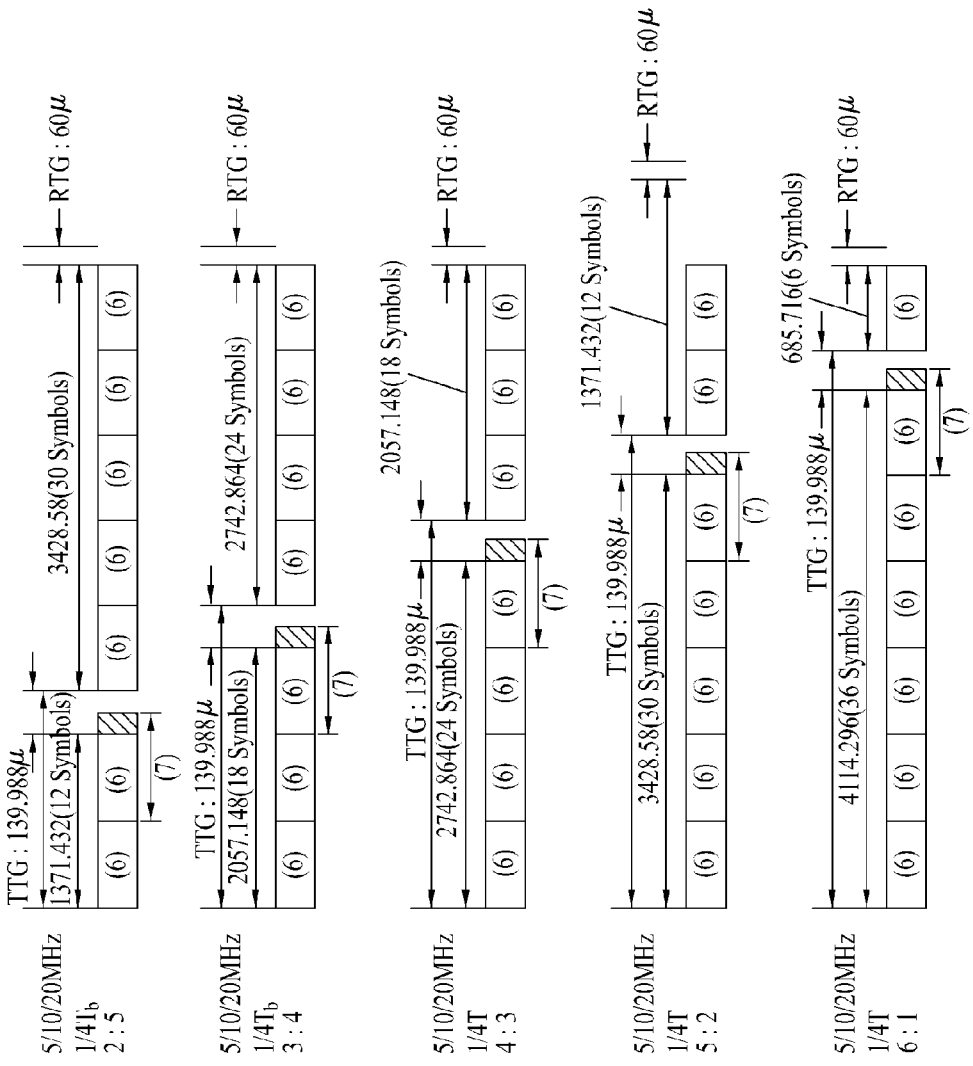
FIG. 23 is a diagram for an example of a TDD frame structure with a CP length of 1/4 Tb.

FIG. 23 is a diagram for examples of a TDD frame structure with a CP length of ¼ Tb.

Referring to the FIG. 23, as an example of TDD frame structure with a CP length of ¼ Tb, one frame may include 7 subframes. As shown in the FIG. 23, a ratio of the number of DL subframes to the number of UL subframes in the TDD frame is set to one of (2:5), (3:4), (4:3), (5:2) and (6:1). TTG may be located at a last DL subframe, RTG may be located at a last UL subframe. One symbol may be allocated as idle interval of TTG/RTG in the TDD frame.

The number of available symbols in the TDD frame structure is 42 except for 1 symbol for TTG/RTG. Thus, one frame including 7 subframes may be constructed with only a first type subframe including 6 OFDMA symbols. A first type subframe structure may be succeeded by constructing frame using only the first type subframe. 6*k OFDMA symbols (k=the number of DL subframes) are allocated to DL interval and 6*j OFDMA symbols (j=the number of UL subframes) are allocated to UL interval.

Figure 24:
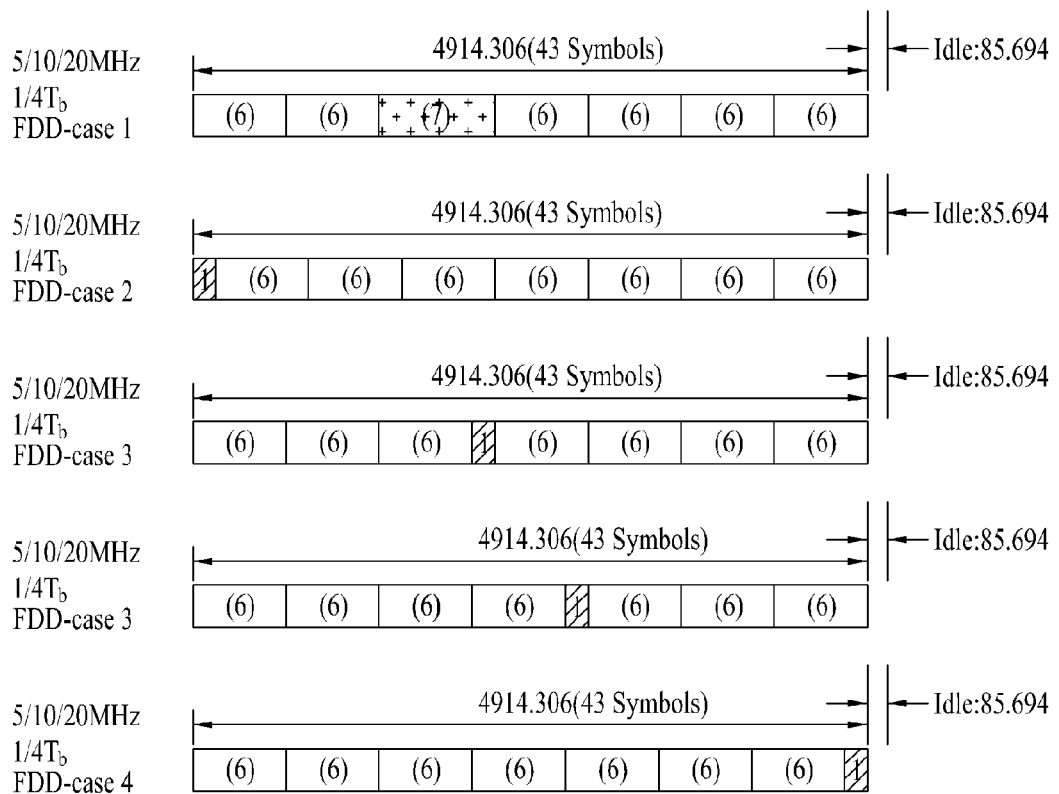
FIG. 24 is a diagram for an example of a FDD frame structure with a CP length of 1/4 Tb.

FIG. 24 is a diagram for examples of a FDD frame structure with a CP length of ¼ Tb.

The FDD frame structure shown in the FIG. 24 is frame structure corresponding to the TDD frame structure shown in the FIG. 23. 43 OFDMA symbols may be allocated to the FDD frame. The FDD frame structure may include 7 subframes has not TTG/RTG interval unlike TDD frame structure, the FDD frame structure may further utilize one symbol compared to TDD frame structure. Subframe locations of additionally available one symbol are shown in the FIG. 24, respectively. The additional one symbol may be located next to a first subframe, a third subframe, a fourth subframe, or a seventh subframe in the FDD frame. An idle interval may be located next to a last subframe in the FDD frame.

FIG. 24 shows the FDD frame including 7 subframes. In this case, a second type subframe is configured and used by adding 1 symbol to 1 first type subframe among a plurality of first type subframes. A location of the second type subframe is non-limited. That is, one additional symbol may be located at a first subframe, a third subframe, a fourth subframe, or a last subframe in the FDD frame. More particularly, the second type subframe in the FDD frame may be located in the same order of a last downlink subframe located in the TDD frame. The proposed location of the one additional symbol is just exemplary. The proposed location of the one additional symbol is non-limited in the FDD frame.

Figure 25:
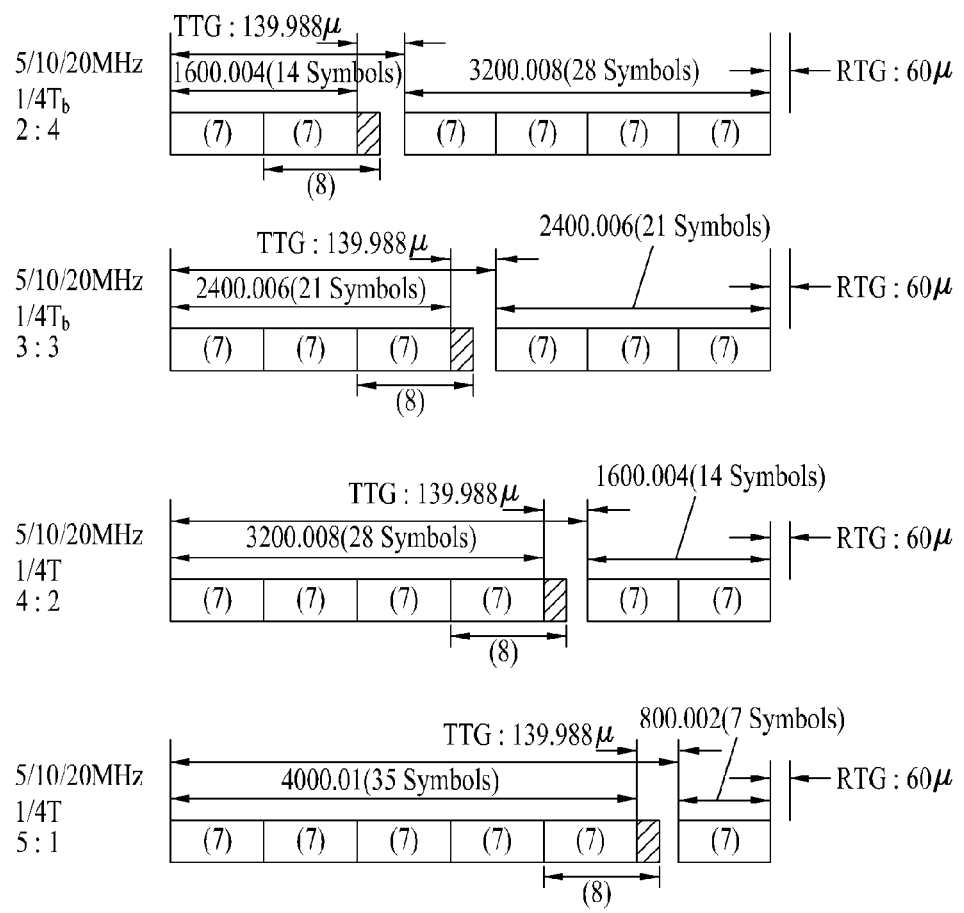
FIG. 25 is a diagram for an example of a TDD frame structure with a CP length of 1/4 Tb.

FIG. 25 is a diagram for examples of a TDD frame structure with a CP length of ¼ Tb.

Referring to the FIG. 25, subframes may be constructed with only a second type subframe including 7 OFDMA symbols. Since the number of available symbols is 42 in the TDD frame, one frame may include 6 subframes if each of subframes is constructed with 7 symbols. Thus, one frame may be constructed with subframes of 1 kind of type. A ratio of the number of DL subframes to the number of UL subframes in the frame constructed by using a second type subframe may be set to (2:4), (3:3), (4:2), or (5:1). One symbol may be allocated as idle time of TTG/RTG.

Figure 26:
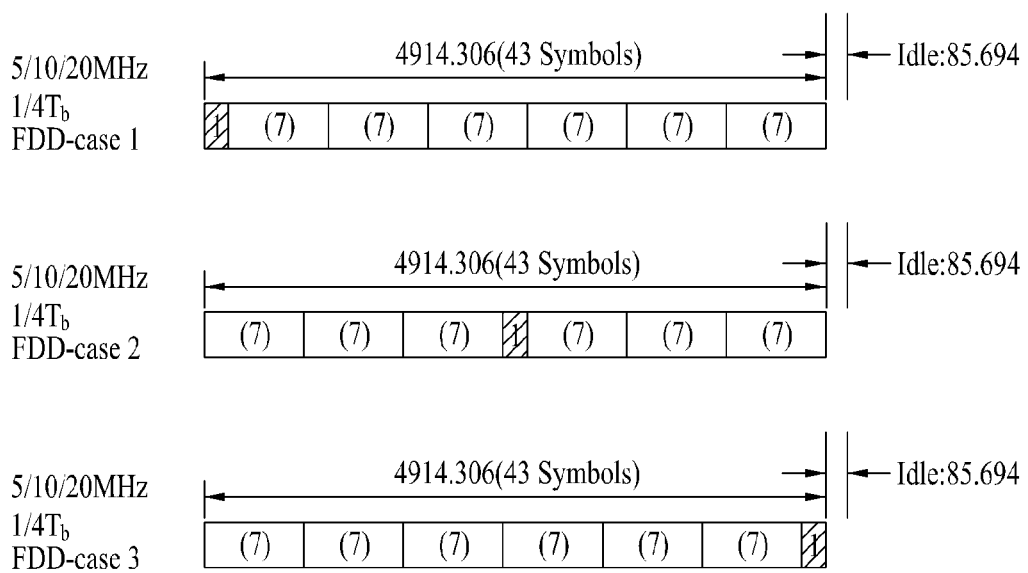
FIG. 26 is a diagram for an example of a FDD frame structure with a CP length of 1/4 Tb.

FIG. 26 is a diagram for examples of a FDD frame structure with a CP length of ¼ Tb.

Referring to the FIG. 26, the FDD frame structure shown in the FIG. 26 is frame structure corresponding to the TDD frame structure shown in the FIG. 25. 43 OFDMA symbols may be allocated to the FDD frame. The FDD frame structure constructed by using a second type subframe may further utilize one symbol compared to TDD frame structure. For example, a new type subframe including 8 OFDMA symbols may be configured by adding the 1 symbol to 1 second type subframe unlike case of the FIG. 24. However, the new type subframe departs from the scope of the previous defined subframe type.

Therefore, method for using one symbol independently or additionally may be considered. When one symbol is independently added, one additional symbol is located at a first subframe in the frame as above described in the FDD frame structure and the one additional symbol may be used for transmission of control information in unit of symbol (e.g., preamble, frame control header (FCH)). Alternatively, the one additional symbol is located at a last subframe and the one additional symbol may be used for transmitting additional information such as sounding. One additional symbol may independently or additionally be allocated at a center of the frame in consideration of the H-FDD frame structure or midamble in the frame.

In other words, one additional symbol may independently or additionally be allocated between a third subframe and a fourth subframe in the frame. This is just exemplary, the location of additional one symbol is non-limited in the FDD frame structure.

As above described, a mobile station (MS) may transmit and receive a signal using FDD frame structure having commonality with the TDD frame structure, and TDD frame structure with a CP length of ¼ Tb.

Figure 27:
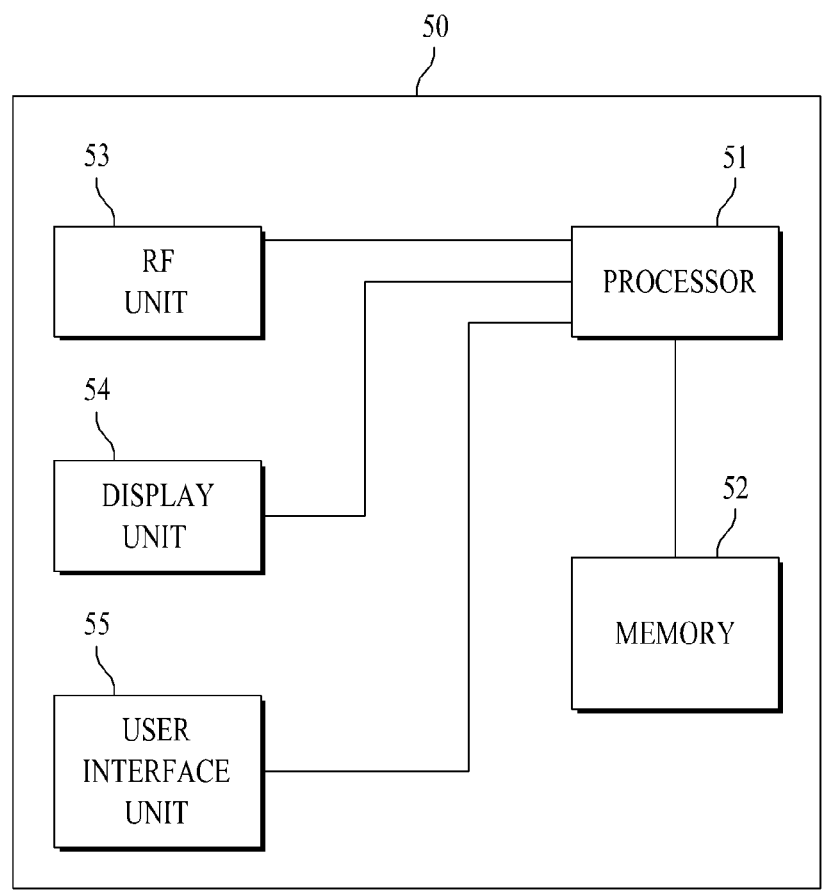
FIG. 27 is a block diagram showing constitutional elements of a device 50 that may be either the MS or the BS.

FIG. 27 is a block diagram showing constitutional elements of a device 50, that may be either the MS or the BS, and that can perform the methods of FIGS. 6 to 26. Device 50 includes a processor 51, a memory 52, a radio frequency (RF) unit 53, a display unit 54, and a user interface unit 55. Layers of the radio interface protocol are implemented in the processor 51. The processor 51 provides the control plane and the user plane. The function of each layer can be implemented in the processor 51. The processor 51 may also include a contention resolution timer. The memory 52 is coupled to the processor 51 and stores an operating system, applications, and general files. If device 50 is a MS, the display unit 54 displays a variety of information and may use a well-known element such as a liquid crystal display (LCD), an organic light emitting diode (OLED), etc. The user interface unit 55 can be configured with a combination of well-known user interfaces such as a keypad, a touch screen, etc. The RF unit 53 is coupled to the processor 51 and transmits and/or receives radio signals. The RF unit 53 may include transmitting module, receiving module, transceiving module.

Layers of a radio interface protocol between the UE and the network can be classified into a first layer (L1), a second layer (L2), and a third layer (L3) based on the lower three layers of the open system interconnection (OSI) model that is well-known in the communication system. A physical layer, or simply a PHY layer, belongs to the first layer and provides an information transfer service through a physical channel. A radio resource control (RRC) layer belongs to the third layer and serves to control radio resources between the UE and the network. The UE and the network exchange RRC messages via the RRC layer.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

Embodiments of the present invention can be implemented using various means. For instance, embodiments of the present invention can be implemented using hardware, firmware, software and/or any combinations thereof. In the implementation by hardware, one embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for transceiving a signal in a wireless communication system, the method comprising:
   transceiving the signal through an FDD (frequency division duplex) frame according to a frame structure,
   wherein the FDD frame comprises 7 subframes that comprise 6 first type subframes and 1 second type subframe, each of the 6 first type subframes including 6 OFDMA (orthogonal frequency division multiple access) symbols and the 1 second type subframe including 7 OFDMA symbols, and
   wherein a channel bandwidth of the FDD frame is set to 5 MHz, 10 MHz or 20 MHz.

2. The method of claim 1, wherein the 1 second type subframe a fourth subframe in the FDD frame.

3. The method of claim 1, wherein an idle time is located next to a last subframe in the FDD frame.

4. The method of claim 1, wherein:
   the FDD frame comprises a CP (cyclic prefix); and
   a length of the CP is set to ¼ of a useful symbol length.

* * * * *